(12) United States Patent
Kimura et al.

(10) Patent No.: US 8,555,027 B2
(45) Date of Patent: Oct. 8, 2013

(54) SEMICONDUCTOR MEMORY CONTROLLING DEVICE

(75) Inventors: Tetsuro Kimura, Tokyo (JP); Shigehiro Asano, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 3 days.

(21) Appl. No.: 13/038,845

(22) Filed: Mar. 2, 2011

(65) Prior Publication Data

US 2012/0072680 A1    Mar. 22, 2012

(30) Foreign Application Priority Data

Sep. 22, 2010   (JP) ................................ 2010-212645

(51) Int. Cl.
*G06F 9/26* (2006.01)
*G06F 9/34* (2006.01)
(52) U.S. Cl.
USPC .......... 711/206; 711/114; 714/6.24; 714/6.32
(58) Field of Classification Search
USPC ................ 711/170, 114, 206; 714/6.24, 6.32
See application file for complete search history.

(56) References Cited

U.S. PATENT DOCUMENTS

| | | | | |
|---|---|---|---|---|
| 5,986,933 | A * | 11/1999 | Takeuchi et al. | 365/185.12 |
| 6,912,614 | B2 * | 6/2005 | Tomita | 711/4 |
| 2007/0073994 | A1 * | 3/2007 | Zohar et al. | 711/173 |
| 2009/0327803 | A1 * | 12/2009 | Fukutomi et al. | 714/7 |

FOREIGN PATENT DOCUMENTS

| | | |
|---|---|---|
| JP | 6-231049 A | 8/1994 |
| JP | 2001-051806 | 2/2001 |
| JP | 2003-167690 | 6/2003 |
| JP | 2004-38237 A | 2/2004 |
| JP | 2006-228138 A | 8/2006 |
| JP | 2007-323224 A | 12/2007 |
| JP | 2008-9635 A | 1/2008 |
| JP | 2009-99112 A | 5/2009 |
| JP | 2010-152551 A | 7/2010 |

OTHER PUBLICATIONS

M. Kitsuregawa, "Disk Array", Storage Networking Technology, Appendix I, Sec. 1-3, 2005, 12 pages.
Mendel Rosenblum, et al., "The Design and Implementation of a Log-Structured File System", Electrical Engineering and Computer Sciences, Computer Science Division, University of California, Jul. 24, 1991, pp. 1-15, (http://www.eecs.berkeley.edu/~brewer/cs262/Lst.pdf).

(Continued)

*Primary Examiner* — Jared Rutz
(74) *Attorney, Agent, or Firm* — Oblon, Spivak, McClelland, Maier & Neustadt, L.L.P.

(57) ABSTRACT

According to one embodiment, a semiconductor memory controlling device includes a write control unit that writes a predetermined number of pieces of first data and redundant information calculated by using the predetermined number of pieces of the first data and used for correcting an error in the first data into different semiconductor storage drives, respectively; a constructing unit that constructs a storage area for storing therein a table by using driver information, the table showing an association between a logical address and a physical address of the first data and identification information for associating the predetermined number of pieces of first data with the redundant information; and a table controlling unit that stores, into the storage area, the table associated with the identification information, the physical address and the logical address of the predetermined number of pieces of the first data, and a physical address of the redundant information.

5 Claims, 19 Drawing Sheets

(56) References Cited

OTHER PUBLICATIONS

Office Action issued Aug. 7, 2012 in Japanese Patent Application No. 2010-212645 (with English-language translation).

Office Action mailed Mar. 26, 2013 in Japanese Patent Application No. 2010-212645 filed Sep. 22, 2010 (with English translation), 4 pages.

* cited by examiner

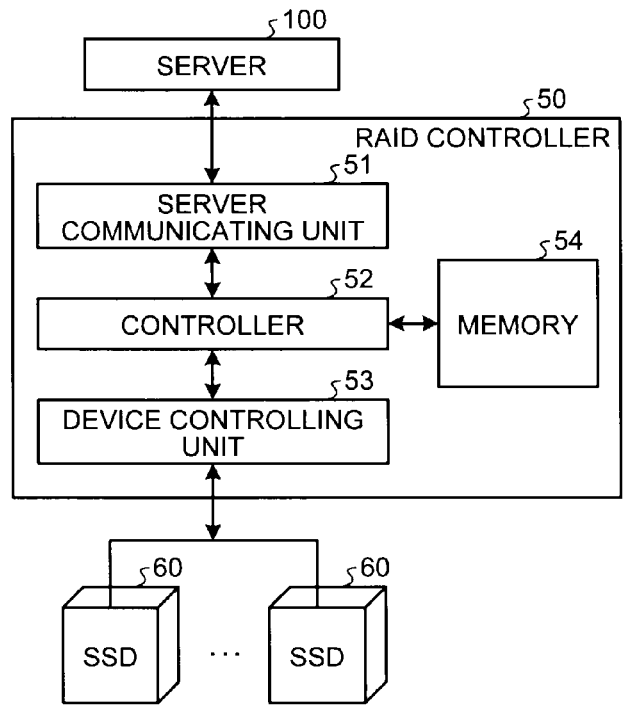
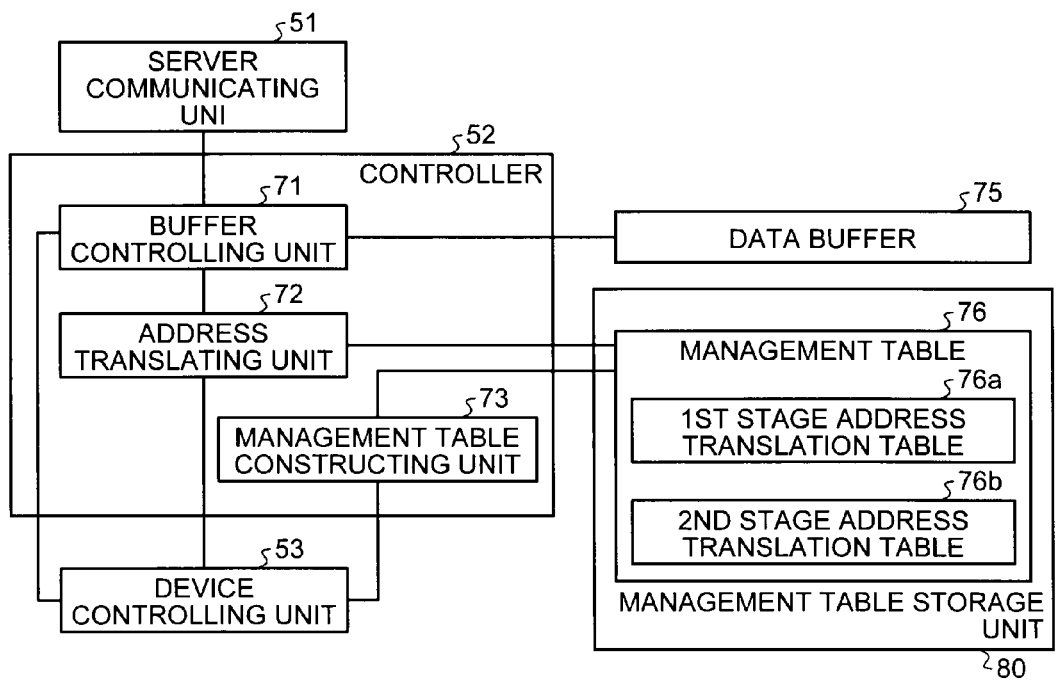

FIG.4

| DATA | LOGICAL ADDRESS | PAGE ECC |
|---|---|---|

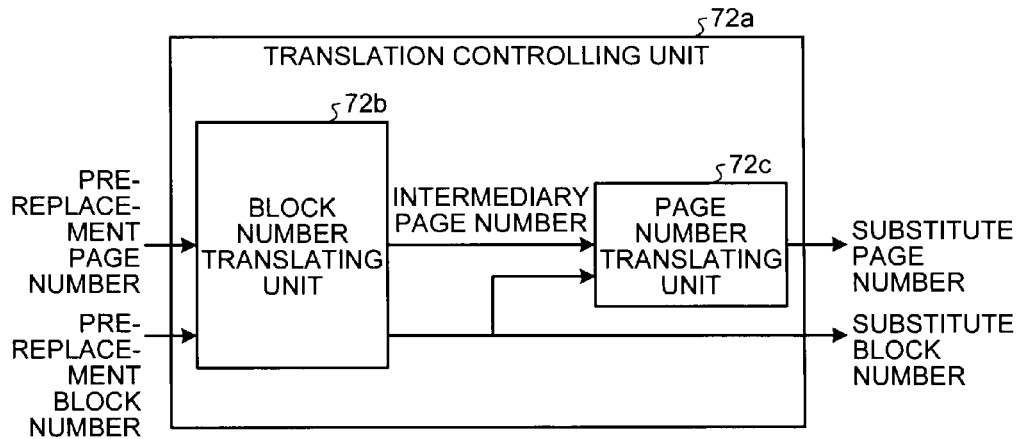

FIG.14

| PAGE SIZE | PATTERN | 3RD STAGE ADDRESS TRANSLATION TABLE |
|---|---|---|
| PRE-REPLACEMENT > SUBSTITUTE | | PRE-REPLACEMENT PAGE SIZE/SUBSTITUTE PAGE SIZE<br><br>INTER-MEDIARY PAGE # → ⊗ → Phy.Page# |
| PRE-REPLACEMENT < SUBSTITUTE | | INTER-MEDIARY PAGE # — UPPER / LOWER<br>↓ ↓<br>Phy.Page#  OFFSET WITHIN SUBSTITUTE PAGE |

SEMICONDUCTOR MEMORY CONTROLLING DEVICE

CROSS-REFERENCE TO RELATED APPLICATIONS

This application is based upon and claims the benefit of priority from Japanese Patent Application No. 2010-212645, filed on Sep. 22, 2010; the entire contents of which are incorporated herein by reference.

FIELD

Embodiments described herein relate generally to a semiconductor memory controlling device.

BACKGROUND

Conventionally, as a means for preventing data losses caused by failures in storage devices such as Hard Disk Drives (HDDs), storing methods including Redundant Array of Inexpensive Disks (RAID) 5 have popularly been used. According to RAID 5, a virtual HDD is structured by combining a plurality of HDDs together and an error correction code is structured with the plurality of HDDs, so that it is possible to address failures that occur in each of the HDDs. More specifically, according to RAID 5, an error correction code (parity) is assigned to a plurality of pieces of data (called a parity group), so that the plurality of pieces of data and the parity are distributed across and stored in the plurality of HDDs.

However, according to a storing method such as RAID 5, when it is requested to rewrite old data stored in a part of blocks in an HDD, the stored old data and parity need to be read before new data is written into the HDD, for the purpose of calculating a new parity. This is called "write penalty". A problem has been known where the overhead of such write penalty causes the level of performance to become lower. As one of the methods for solving this problem, a method has been known in which a plurality of pieces of data written into small blocks is buffered by adopting a log-structured file system, and at the point in time when the size of the buffered data reaches the size of the parity group, a parity is calculated and is simultaneously written into HDD.

In recent years, it has been proposed to adopt a RAID technique using semiconductor memory devices such as NAND flash memories, instead of to HDDs as described above. These semiconductor memory devices are called block-erase-type semiconductor memory devices because data is erased in units of blocks. In block-erase-type semiconductor memory devices, rewriting cannot be performed on a page basis. Therefore, after erasure is performed on the entirety of a block, the data needs to be written sequentially from the top page of the block. In contrast, when it is requested from an apparatus superordinate to an HDD to write data into the HDD, a sector address is specified regardless of blocks and pages. For this reason, as one of the methods for improving efficiency of data writing in a Solid State Drive (SSD) that uses a block-erase-type semiconductor memory device as a storage medium, a method has been known in which pieces of data to be requested to write are sequentially and successively written into pages in the order of the arrival thereof, regardless of the order of the sector addresses, so that an association between the block number and the page number of the written data and the sector address is separately managed by the SSD.

This method is efficient in the case where the method is used by one SSD alone; however, in the case where RAID 5, RAID 6, or the like is structured by combining a plurality of SSDs together, there is a possibility that the usage life of the block-erase-type semiconductor memory devices may be shortened because the level of performance is degraded by the write penalty and because the frequency of updating parities is high.

BRIEF DESCRIPTION OF THE DRAWINGS

FIG. 1 is a diagram of an exemplary hardware configuration of a RAID controller according to a first embodiment;

FIG. 2 is a diagram of an exemplary functional configuration of the RAID controller;

FIG. 4 is a drawing of an example of writing target data to which redundant information has been appended;

FIG. 12 is a diagram of an exemplary internal configuration of a translation controlling unit 72a;

FIG. 13 is a drawing for explaining a translating process performed by a block number translating unit 72b;

FIG. 14 is a drawing for explaining a translating process performed by a page number translating unit;

DETAILED DESCRIPTION

Figure 3:
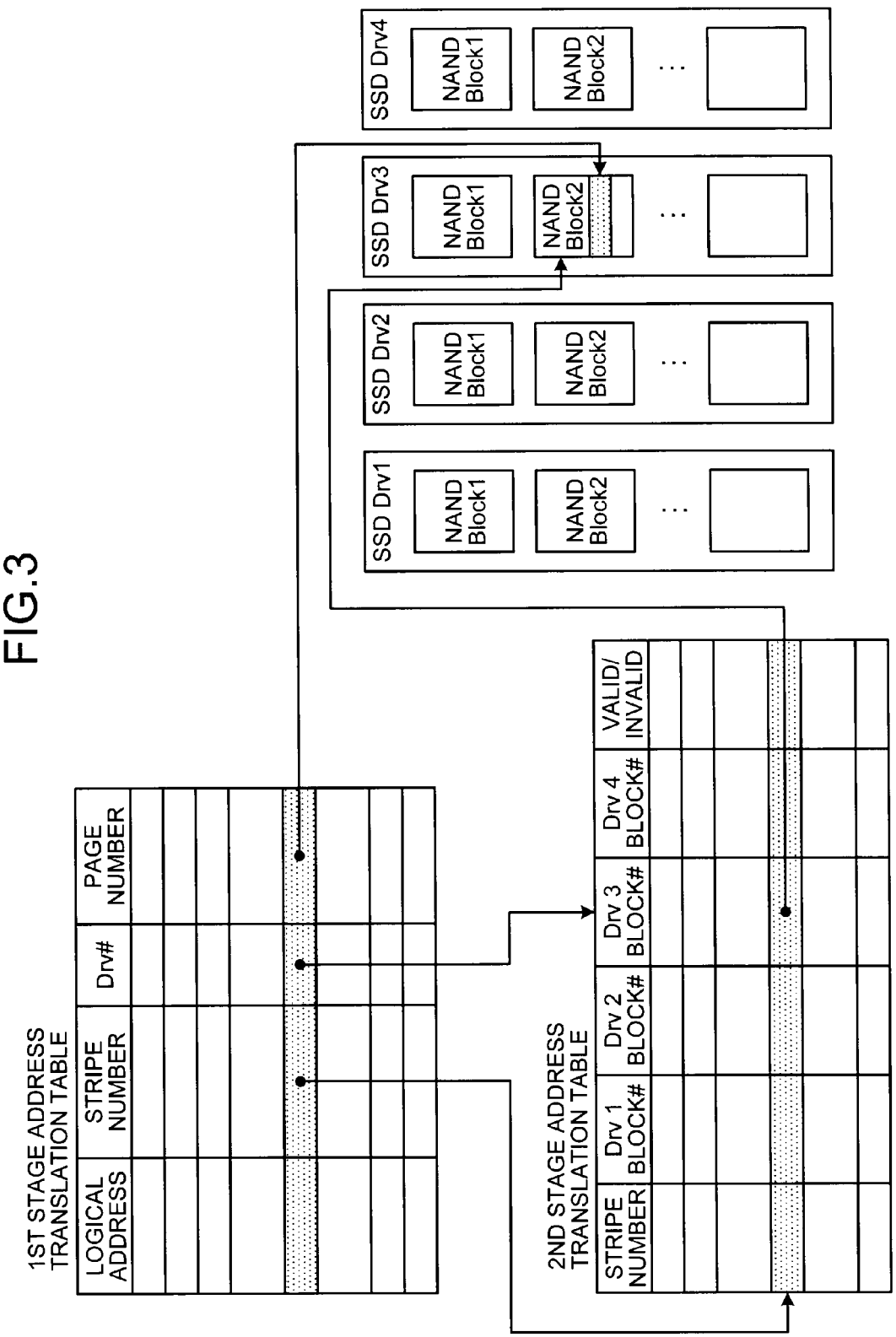
FIG. 3 is a drawing of examples of a 1st stage address translation table and a 2nd stage address translation table.

According to one embodiment, a semiconductor memory controlling device to which a plurality of semiconductor memory drives are connected and that writes data requested to be written with a logical address specified by an information processing apparatus. The data includes one or more pieces of first data having a predetermined size. The device includes a write control unit configured to write a predetermined number of pieces of first data having the predetermined size and redundant information that is calculated by using the predetermined number of pieces of the first data and is used for correcting an error in the predetermined number of pieces of the first data into different semiconductor storage drives, respectively; a constructing unit configured to construct a first table storage area for storing therein a first table by using information about specifications of the semiconductor memory drives, the first table showing an association between a logical address and a physical address indicating a position into which the first data is written within the semiconductor memory drives and identification information for associating the predetermined number of pieces of first data with the redundant information; and a table controlling unit configured to store the first table into the first table storage area, the first table being associated with the identification information, the physical address and the logical address of the predetermined number of pieces of the first data written into the semiconductor memory drives by the write control unit, and a physical address indicating a position in which the redundant information is written.

Various embodiments will be described hereinafter with reference to the accompanying drawings.

First, a hardware configuration of a semiconductor memory controlling device according to a first embodiment will be explained with reference to FIG. 1. A server 100 and a plurality of semiconductor memory devices (SSDs) 60 are connected, via respective interfaces thereof, to a Redundant Array of Inexpensive Disks (RAID) controller 50 that is the semiconductor memory controlling device according to the first embodiment. Each of the interfaces may be, for example, a fibre channel, an SAS, or an iSCSI. The RAID controller 50 includes a server communicating unit 51, a controller 52, a device controlling unit 53, and a memory 54. Also, although not shown, a nonvolatile memory that stores therein system programs is installed in the RAID controller 50. Further, a display unit that displays information may be connected to the RAID controller 50.

Under control of the controller 52, the server communicating unit 51 controls communication with the server 100. The memory 54 stores therein programs that are executed when an electric power source is turned on, as well as various types of data. The controller 52 is implemented by a Central Processing Unit (CPU). The controller 52 controls the entirety of the RAID controller 50 and causes various types of functions to be realized by, when the electric power source is turned on, reading a program from the memory 54, executing the read program, transferring the various types of system programs stored in the nonvolatile memory to the memory 54 according to the executed program, and executing the system programs in the memory 54. More specifically, the controller 52 receives and interprets a command transmitted from the server 100 via the server communicating unit 51. The controller 52 controls writing of data into any of the SSDs 60 or reading of data from any of the SSDs 60, in accordance with to the command. Under control of the controller 52, the device controlling unit 53 writes data into any of the SSDs 60 or reads data from any of the SSDs 60.

Each of the SSDs 60 includes a semiconductor drive and a controlling circuit that exercises control over the semiconductor drive, as well as an error correcting circuit. The semiconductor drive is removable (portable) and includes one or more semiconductor memory elements. The semiconductor drive is, for example, a storage device configured by using a plurality of NAND flash memories each of which is a semiconductor memory element. The semiconductor memory element such as NAND flash memory cannot read/write at random but can perform reading/writing in unit called a page. A plurality of pages form a storage area in unit called a block. In the present example, one page is made of 4 KB, and on block is formed by 64 pages. Each of the semiconductor memory elements is constituted by a plurality of blocks that are put together. Each of the SSDs 60 is configured by a plurality of semiconductor memory elements that are put together. Each of the SSDs 60 is removably attached to the RAID controller 50. Accordingly, at the time when the RAID controller 50 is initially configured or when a failure has occurred in any of the SSDs 60 that are already attached to the RAID controller 50, a user is able to attach any desired SSD 60 to the RAID controller 50. It should also be noted that, to be able to identify each of the plurality of SSDs 60, a drive number is assigned to each of the SSDs 60.

Next, a method for constituting an error correction code (RAID) with the plurality of SSDs 60 will be explained. According to the first embodiment, one of the SSDs 60 is used as an SSD into which redundant information is to be written. The predetermined number of SSDs 60 other than the SSD is used as SSDs into which data requested to be written by a host is to be written. The error correction code is constituted by data stored in a set of blocks respectively included in these SSDs 60, and the data is written in units of pages. In other words, in a basic configuration according to the first embodiment, with respect to the data requested to be written, the RAID controller 50 writes pieces of data in units of pages and redundant information (corresponding to the parity mentioned above) that is calculated by using a predetermined number of pieces of data (first data) and is used for correcting errors in the predetermined number of pieces of data into the different SSDs 60, respectively. The predetermined number of pieces of data and the redundant information constitutes the error correction code. A parity code, for example, may be used as the error correction code.

Next, a method for writing data into the SSDs 60 will be explained. Conventionally, a log-structured method has been adopted in NAND semiconductor memory elements. Regardless of a logical address (Logical Block Address (LBA)) specified by the server 100, data is written into an erased block in units of pages (e.g., in units of 4 KB) in the order of the pages. An association between a physical address (Physical Block Address (PBA)) indicating the physical storage position in which the data has been written and the logical address is stored, and a data reading operation is performed by using the association. This method is called the log-structured method. In the log-structured method, a block needs to be erased before writing. Erasure of a block is to set all bits constituting the block to "1". The SSD 60 performs such erasure in units of blocks and performs writing in units of pages to the erased block. Accordingly, in the SSD 60 constituted by the NAND semiconductor memory elements, data can be sequentially written into unwritten pages in an erased block, and written pages cannon be overwritten. Writing of data in response to the request from the server 100 is indicated by a logical address (Logical Block Address (LBA)) such as a sector address used by the server 100. In contrast, writing of data and redundant information into the server 100 is performed according to the physical storage positions thereof (Physical Block Address (PBA)) within the corresponding SSD 60, in the ascending order of pages, regardless of the logical addresses thereof. The units of data that are dealt with in the server 100 are sectors. The size of each of the sectors (hereinafter, the "sector size") may be different from the page size. The association between the logical addresses and the physical addresses is stored into a management table, which is explained later. When writing of new data is requested by the server 100 with the logical address specified in the previous data request bein specified again, the RAID controller 50 writes the new data into an unwritten page of an erased block in the SSDs 60. In this situation, the page to which writing corresponding to this logical address is previously performed is set to be invalid and the pages into which the new data is written is set to be valid. The RAID controller 50 writes new data and redundant information, while constituting the error correction code described above.

Next, a functional configuration of the RAID controller 50 will be explained with reference to FIG. 2. In addition to the functions of the server communicating unit 51 and the device controlling unit 53 that are described above, the RAID controller 50 includes a buffer controlling unit 71, an address translating unit 72, a management table constructing unit 73, a data buffer 75, and a management table storage unit 80. The buffer controlling unit 71, the address translating unit 72, and the management table constructing unit 73 are implemented when the controller 52 executes a program. A management table 76 is stored into the management table storage unit 80. The data buffer 75 and the management table storage unit 80 are stored in the memory 54 shown in FIG. 1.

The server communicating unit 51 controls the communication with the server 100 that is performed via the server communicating unit 51. The server communicating unit 51 receives a command transmitted from the server 100. When the command requests writing of data with a specified logical address, the server communicating unit 51 transmits the command (referred to as write command) to the buffer controlling unit 71, which is explained later. In contrast, in the case where a command transmitted from the server 100 requests reading of data with a specified logical address, the server communicating unit 51 transmits the command (referred to as read command) to the buffer controlling unit 71.

The buffer controlling unit 71 temporarily stores the command and the data received from the server 100 via the server communicating unit 51 into the data buffer 75. In the first embodiment, in the case where the command received from the server 100 requests writing of data with a specified logical address, the buffer controlling unit 71 stores the data into the data buffer 75 in the order of the arrival of the data while associating the data with the logical address. Further, at the time when pieces of data used for generating an error correction code for one stripe are stored altogether in the data buffer 75, the buffer controlling unit 71 calculates redundant information by using the pieces of data to be used for generating an error correction code for one stripe and transmits, to the device controlling unit 53, a write command requesting to write the pieces of data and the redundant information into the SSDs 60. After writing of the data in response to the request is finished, the buffer controlling unit 71 may keep the data in the data buffer 75 in anticipation of a later request demanding that the data should be read, or the buffer controlling unit 71 may delete the data from the data buffer 75.

Next, the stripe will be explained. As explained above, according to the first embodiment, with respect to the data requested to be written by the server 100, the error correction code is constituted by the predetermined number of pieces of data in units of pages and the redundant information, so that the pieces of data and the redundant information are written into the different SSDs 60, respectively. A group of pieces of data formed by putting together one page of a block in each of the SSDs 60 for constituting an error correction code is referred to as a stripe. A stripe number is an identification number that is assigned to a set made up of blocks respectively included in the SSDs 60 for constituting the error correction code. According to the first embodiment, when a free block is newly assigned, the set made up of the blocks respectively included in the SSDs 60 for constituting the error correction code is simultaneously selected in the SSDs 60. An unused stripe number is assigned to the set. Then, pieces of data in units of pages are written into pages, respectively, the pages being respectively included in the blocks that belong to the set to which the stripe number has been assigned. Thus, a set made up of those pages form one stripe.

That is, the time at which the pieces of data to be used for generating an error correction code for one stripe are stored altogether in the data buffer 75 is the time at which the predetermined number of pieces of data is stored altogether.

The management table constructing unit 73 constructs the management table 76. More specifically, when newly constructing the management table 76, the management table constructing unit 73 collects information about specifications of the SSDs 60 connected to the RAID controller 50 and used for constructing the error correction code, so as to construct the management table 76 suitable for the specifications of the SSDs 60, according to an instruction related to the constitution of the error correction code. The information about the specifications includes information about the block size, information about the number of blocks, and the information about the page size. The instruction related to the constitution of the error correction code is, for example, transmitted from the server 100 via the server communicating unit 51. How the management table constructing unit 73 constructs the management table 76 will be explained in detail later in a description of operations.

The management table 76 is information that indicates the association between logical addresses and physical addresses as well as identification information for associating data and redundant information with each other. The management table 76 includes, for example, a 1st stage address translation table 76a and a 2nd stage address translation table 76b. According to the first embodiment, the identification information corresponds to the stripe number described above. FIG. 3 is a drawing of exemplary data configurations of the 1st stage address translation table 76a and the 2nd stage address translation table 76b. In FIG. 3, an example in which the number of SSDs 60 connected to the RAID controller 50 is four and in which the block size and the page size are each the same for all of the SSDs 60 is shown; however, the first embodiment is not limited to this example.

The 1st stage address translation table 76a is information that uses each of the logical address as a key and is information in which the following are associated with one another: logical addresses; stripe numbers each of which has been assigned to a set to which the block into which the data corresponding to the logical address has been written belongs; drive numbers each of which has been assigned to the SSD 60 having the block into which the data has been written; and page numbers each of which identifies the page into which the data has been written within the block. In the 1st stage address translation table 76a shown in FIG. 3, the logical addresses are shown in the first column, and a stripe number, a drive number, and a page number are kept in correspondence with each of the logical addresses while being arranged side by side; however, as long as it is possible to automatically select one of the rows in the 1st stage address translation table 76a based on a logical address, it is acceptable to omit the column showing the logical addresses. Further, in the case where the page size is larger than the sector size, it is possible to refer to the 1st stage address translation table 76a by using, as a key, upper bits remaining after lower bits of a logical address are eliminated, the eliminated lower bits corresponding to the bit width used for identifying the position of the sector corresponding to the logical address within the page. For example, in the case where the sector size is 512 bytes and the page size is 2048 bytes, because it is necessary to use 2 bits to identify the position of the sector corresponding to a logical address within the page, it is possible to refer to the 1st stage address translation table 76a by using, as a key, the upper N-2 bits of the logical address, where N denotes the bit width of the logical address.

The 2nd stage address translation table 76b is information that uses each of the stripe numbers as a key and is information in which the following are associated with one another: stripe numbers each of which is assigned to a set made up of blocks in the SSDs 60 for constituting an error correction code; block numbers that identify the blocks in the SSDs 60 that belong to the set; and valid/invalid flags. In the example shown in FIG. 3, the block numbers are stored in association with the drive numbers of the SSDs 60. Each of the valid/invalid flags is information indicating whether at least one of the blocks belonging to the set stores therein valid data (being valid) or not (being invalid). Further, a pointer that indicates a target of writing is set to one of the stripe numbers in the 2nd stage address translation table 76b. When the pointer is updated as necessary, a writing operation is performed on each of the blocks used for constituting the error correction code in the order of the stripe numbers shown in the 2nd stage address translation table 76b.

Based on the drive number and the page number that are associated with the stripe number corresponding to the logical address stored in the 1st stage address translation table 76a described above and also based on the block number corresponding to the drive number that is associated with the stripe number stored in the 2nd stage address translation table 76b, it is possible to identify the page of the block in the SSD 60 in which the data corresponding to the logical address has been written. In other words, the block number and the page number in the SSD 60 that are identified by the drive number correspond to a physical address, and the association between the logical addresses and the physical addresses is stored in the management table 76.

The address translating unit 72 receives a read command from the server communicating unit 51. The address translating unit 72 refers to the management table 76 by using the logical address specified by the received read command so as to identify the drive number of the SSD 60, the block number, and the page number in which the data requested to be read by the read command is written. Subsequently, the address translating unit 72 transmits a read command, to the device controlling unit 53, requesting to read the data specified by the drive number, the block number, and the page number that have been identified. Further, when an error is detected in the data that has been read in response to a read command from the server communicating unit 51 and when the data needs to be recovered, the address translating unit 72 refers to the management table 76 so as to identify the drive numbers of the SSDs 60 in which the data and other pieces of data and the redundant information constituting the error correction code are respectively stored, the block numbers, and the page numbers, by using the logical addresses stored in association with the data. Subsequently, the address translating unit 72 transmits, to the device controlling unit 53, a read command requesting to read the data specified by the drive numbers of the SSDs 60, the block numbers, and the page numbers that have been identified.

When receiving a write command from the buffer controlling unit 71, the device controlling unit 53 determines a target stripe number for writing the pieces of data and redundant information constituting an error correction code for one stripe. Further, the device controlling unit 53 determines target SSDs 60 into which the pieces of data and the redundant information are to be written. The device controlling unit 53 then writes the pieces of data and the redundant information into the determined SSDs 60, respectively. During this writing operation, the device controlling unit 53 sets a write pointer so as to sequentially indicate the writing position for each of the unwritten pages within an erased block in each of the corresponding SSDs 60. Subsequently, the device controlling unit 53 writes the writing target data into the page in the position indicated by the write pointer. After that, the device controlling unit 53 updates the write pointer so as to indicate the position of an unwritten page that follows the page on which the writing process has been performed. Accordingly, the value of the write pointer sequentially changes so as to indicate the next writing position. For example, in the case where each of the blocks is identified by a 15-bit physical address in each channel and where one block contains 64 pages, the write pointer is 21 (=15+6) bits in total.

Figure 4:
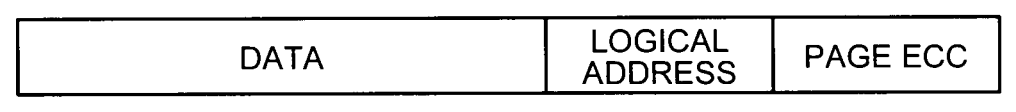

Here, a data structure of the writing target data and the redundant information will be explained. The device controlling unit 53 appends, to the writing target data, an error correction code (referred to as a page ECC) used for detecting and correcting an error in the writing target data itself and a logical address specified by the write command. It is assumed that the page ECC includes a code such as a Cyclic Redundancy Check (CRC) code used for detecting an error in the data and a code such as an Error Correction code (ECC) used for correcting the error in the data. The reason why the page ECC also includes the CRC code is that there is a possibility that, in the case where it is not possible to correct the error in the data with the ECC, the correction may be wrong. FIG. 4 is a drawing of an example of writing target data to which redundant information has been appended. In the SSDs 60 determined in the manner described above, the device controlling unit 53 writes the writing target data to which the page ECC and the logical address are appended into a storage area that stores therein the page indicated by the write pointer within each of the SSDs 60 that have been determined in the manner described above. The writing target data has a size corresponding to each of units of pages; however, the page size of each of the SSDs 60 corresponds to the size of the entirety obtained by appending the page ECC and the logical address to the writing target data.

Returning to the description of FIG. 3, after performing the writing operation as described above, the device controlling unit 53 stores, into the management table storage unit 80, the 1st stage address translation table 76a that is information in which the drive numbers of the SSDs 60 and the page numbers in which the pieces of data have been written are associated with the logical addresses corresponding to the pieces of data, as well as the stripe number that has been determined in the data writing operation. Further, the device controlling unit 53 stores, into the management table storage unit 80, the 2nd stage address translation table 76b that is information in which the block numbers of the blocks into which the pieces of data and the redundant information constituting the error correction code have been written are associated with the drive numbers of the SSDs 60.

Further, when receiving a read command from the address translating unit 72, the device controlling unit 53 reads the data from the page identified by the drive number of the SSD 60, the block number, and the page number that have been specified by the read command and transmits the read data to the server communicating unit 51. In the case where the data read from any of the SSDs 60 has an error, the device controlling unit 53 detects the error and recovers the data.

Further, in the case where a failure has occurred in at least one of the plurality of SSDs 60 used for constituting the error correction code and also where the failed SSD 60 needs to be replaced with another SSD, the device controlling unit 53 recovers the data that has been stored in the failed SSD 60 (hereinafter, the "pre-replacement SSD") into a substitute SSD. This operation also applies to a situation where a new SSD is additionally connected to the RAID controller 50 and to a situation where a spare SSD is connected to the RAID controller 50 in advance so that the spare SSD is used as a substitute for the failed SSD 60. In the following explanation, the SSD that serves as a substitute for the failed SSD 60 will be referred to as a substitute SSD. In that situation, an arrangement is acceptable in which the RAID controller 50 detects that said at least one of the plurality of SSDs 60 used for constituting the error correction code is to be replaced by the substitute SSD based on, for example, an instruction transmitted from the server 100 via the server communicating unit 51. Yet another arrangement is acceptable in which, in the case where a new substitute SSD has additionally been connected, the RAID controller 50 detects the replacement based on a communication performed with the substitute SSD. Subsequently, the device controlling unit 53 checks to see if the substitute SSD satisfies a predetermined condition by using the information about the specifications of the substitute SSD. In the case where the substitute SSD satisfies the predetermined condition, the device controlling unit 53 determines that the data that has been stored in the pre-replacement SSD is to be recovered into the substitute SSD. In this situation, the device controlling unit 53 refers to the 2nd stage address translation table 76b and recovers each of all the pieces of data that have been written in the pre-replacement SSD, by using the error correction code and writes the recovered data into the substitute SSD.

Figure 5:
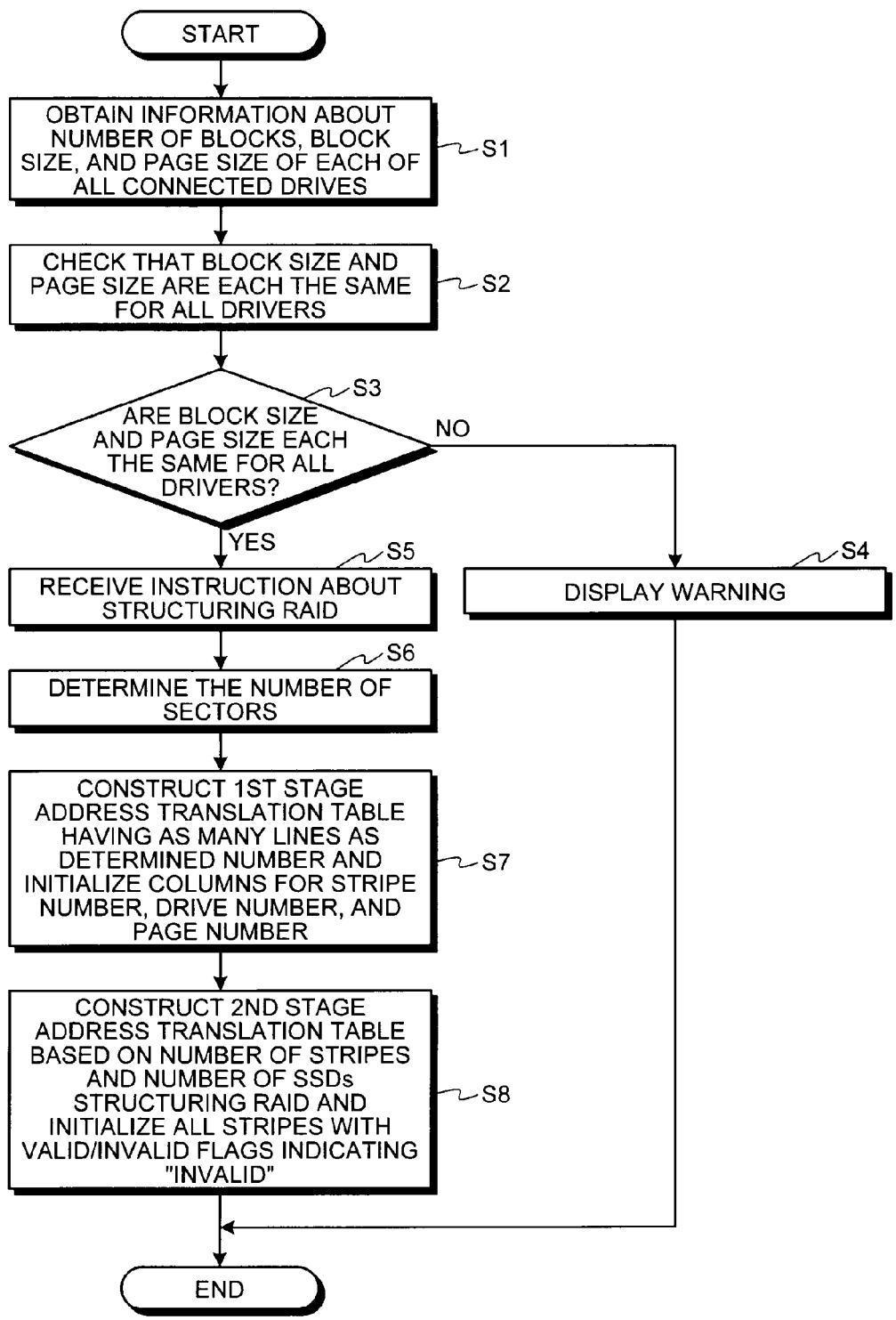
FIG. 5 is a flowchart of a procedure in a process to newly construct a management table.

Next, procedures in processes performed by the RAID controller 50 according to the first embodiment will be explained. First, a procedure in a process performed by the RAID controller 50 to newly construct the management table 76 will be explained with reference to FIG. 5. The RAID controller 50 obtains, from each of the SSDs 60 connected thereto, information about the specifications (the block size, the number of blocks, and the page size) of the SSD 60 (step S1). According to the first embodiment, it is assumed that the block size and the page size are each the same among the plurality of SSDs 60 connected to the RAID controller 50. Thus, the RAID controller 50 checks that the block size and the page size are each the same for all the SSDs 60, by using the information about the specifications that has been obtained from each of the SSDs 60 (step S2). If the block size and the page size are not the same for all the SSDs 60 (step S3: No), a warning is displayed on the display unit (step S4). On the contrary, when the block size and the page size are each the same for all the plurality of SSDs 60 connected to the RAID controller 50 (step S3: Yes), the RAID controller 50 subsequently receives an instruction related to the constitution of an error correction code (step S5). For example, in the case where five SSDs 60 are connected to the RAID controller 50, the RAID controller 50 receives an instruction indicating that one of the five SSDs 60 is used as a spare, whereas the other four SSDs 60 are used for constituting the error correction code. In other words, in this situation, the instruction indicates that the number of SSDs 60 used for constituting the error correction code is five and that the predetermined number of pieces of data that form a set when the error correction code is constituted is four.

Further, according to the instruction, the RAID controller 50 determines the SSDs 60 in which the pieces of data used for constituting the error correction code are stored. By using the information about the specifications obtained from the determined SSDs 60, the RAID controller 50 determines the number of sectors that can be stored into the SSDs 60 (step S6). In this situation, an arrangement is acceptable in which, for the purpose of reducing the cost required by a compaction to reserve free blocks in the SSDs 60, the RAID controller 50 determines the number of sectors so as to be smaller than the maximum number of sectors that can be stored in the SSDs 60.

After that, the RAID controller 50 generates the 1st stage address translation table 76a having rows corresponding to the number of sectors determined at step S6 and stores the generated 1st stage address translation table 76a into a storage area of the memory 54, thereby constructing a storage area for storing therein the 1st stage address translation table 76a (step S7). In the case where the page size is larger than the sector size, an arrangement is acceptable in which the RAID controller 50 generates, within the memory 54, the 1st stage address translation table 76a having as many rows as a value obtained by dividing the page size by the sector size, on the assumption that the data corresponding to a plurality of sectors that are successively positioned is to be stored into each page.

Further, the RAID controller 50 determines a total number of stripes indicating the total number of sets of blocks for constituting the error correction code, by using the page size, the block size, the constitution of the error correction code based on the instruction received at step S5, and the number of sectors determined at step S6. For example, in the case where the page size is 4 KB, the block size is Nb, the number of SSDs 60 into which data is to be written when the error correction code is constituted is four, the number of SSDs 60 into which redundant information is to be written is one, and the number of sectors determined at step S6 is Nts, the following expression is held: the total number of stripes=Nts/(4 KB/512 B)*4*Nb. The RAID controller 50 generates the 2nd stage address translation table 76b having rows corresponding to the total number of stripes determined in the manner described above and stores the generated 2nd stage address translation table 76b into a storage area of the memory 54, thereby constructing a storage area that stores therein the 2nd stage address translation table 76b (step S8). The RAID controller 50 initializes the 2nd stage address translation table 76b by setting the valid/invalid flags so as to indicate that the blocks belonging to the sets corresponding to the rows do not store therein valid data (being invalid). Subsequently, the RAID controller 50 sets a pointer indicating a writing target to the row at the head of the 2nd stage address translation table 76b. The pointer will be set to the next stripe number when each of the blocks used for constituting the error correction code in correspondence with the stripe number no longer has any writable page. Thus, the writing of data into the blocks used for constituting the error correction code is performed in the order of the stripe numbers that have been set in the 2nd stage address translation table 76b.

Figure 6:
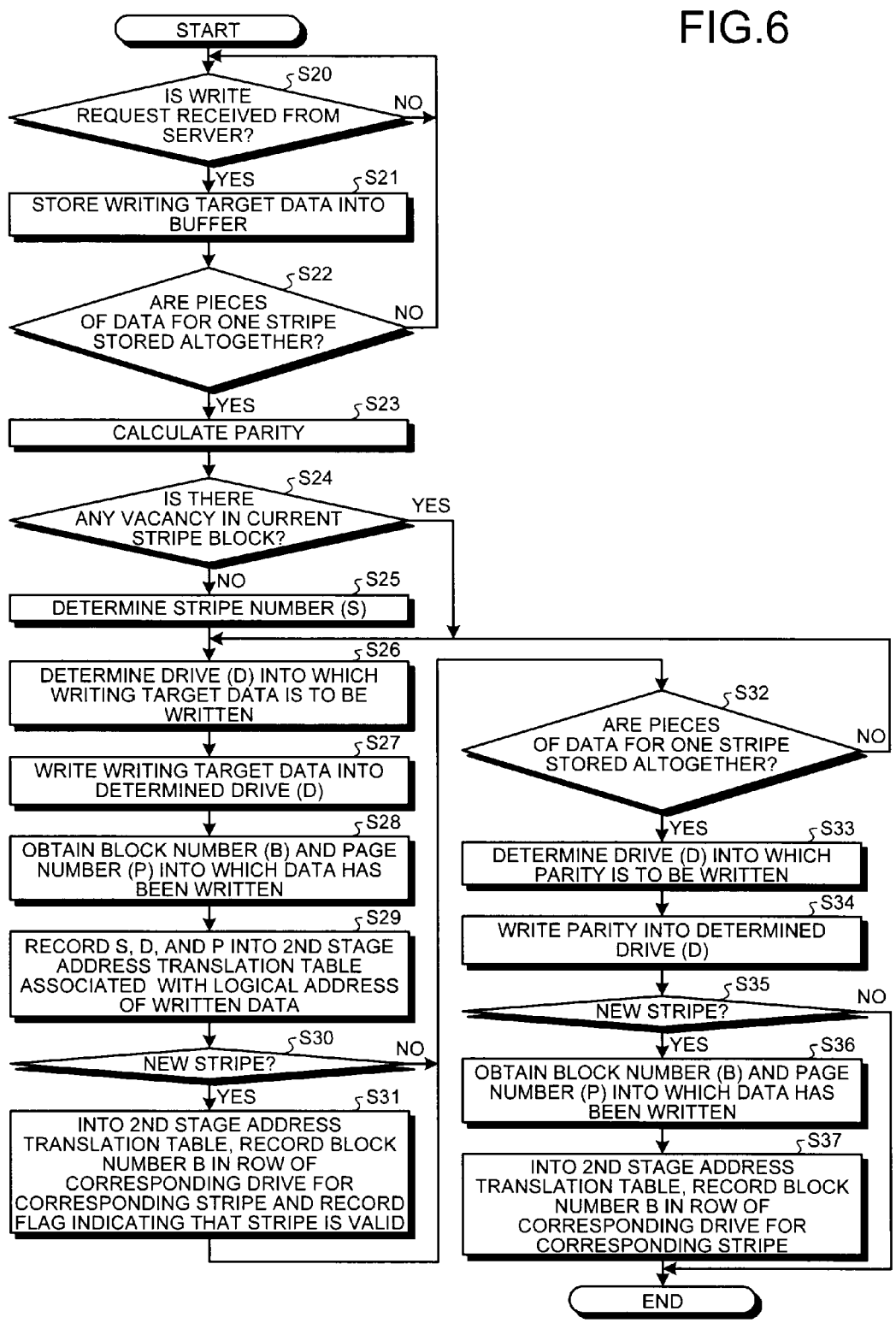
FIG. 6 is a flowchart of a procedure in a process to write data into Semiconductor memory Devices (SSDs)

Next, a procedure in a process performed by the RAID controller 50 to write writing target data into the SSDs 60 in response to a write command from the server 100 will be explained with reference to FIG. 6. When receiving, from the server 100, a write command requesting to write data with a specified logical address (step S20: Yes), the RAID controller 50 stores the data (writing target data) into the data buffer 75 so as to be associated with the logical address (step S21). Subsequently, the RAID controller 50 determines whether the pieces of data used for generating an error correction code for one stripe have been stored altogether in the data buffer 75, that is, determines whether the number of pieces of data stored in the data buffer 75 has reached the predetermined number (step S22). In the case where the determination result at step S22 is in the negative (step S22: No), the process returns to step S20, where the RAID controller 50 stands by until the RAID controller 50 receives, from the server 100, a new write command requesting to write data with a specified logical address. After that, a new write command is received and new data is stored into the data buffer 75. Then, when the pieces of data used for generating an error correction code corresponding for one stripe have been stored altogether in the data buffer 75, a determination result at step S22 is in the affirmative. In that situation (step S22: Yes), with respect to the pieces of data that have been stored in the data buffer 75, the RAID controller 50 calculates an exclusive OR (XOR) by using bytes at the same offset position and calculates redundant information (parity) that contains the XOR value as the value at the same offset position (step S23).

Subsequently, the RAID controller 50 determines whether there is a writable page in the blocks corresponding to the stripe number to which the pointer is set in the storage area storing therein the 2nd stage address translation table 76b (step S24). In the case where the judgment result is in the affirmative (step S24: Yes), the RAID controller 50 determines, as a writing target stripe number, the stripe number stored in the storage area to which the pointer is currently set, and the process proceeds to step S26. In contrast, in the case where the judgment result at step S24 is in the negative (step S24: No), the RAID controller 50 determines a new stripe number in the 2nd stage address translation table 76b (step S25). Subsequently, the RAID controller 50 updates the pointer to the storage area that stores therein the new stripe number within the storage area storing therein the 2nd stage address translation table 76b, and the process proceeds to step S26. At step S26, the RAID controller 50 performs the process as follows for each of the pieces of data stored in the data buffer 75: The RAID controller 50 determines an SSD 60 into which data to be processed is to be written. After that, the RAID controller 50 writes the data to be processed into the SSD 60 determined at step S26 (step S27).

Subsequently, the RAID controller 50 obtains the drive number of the SSD 60 into which the data to be processed has been written at step 27, the block number of the block within the SSD 60, and the page number of the page within the block (step S28). The RAID controller 50 stores the logical address being associated with the data to be processed into the 2nd stage address translation table 76b, so as to be associated with the stripe number, the drive number, and the page number (step S29). In the case where a new stripe number has been determined at step S25 (step S30: Yes), the RAID controller 50 stores, into a row corresponding to the new stripe number within the 2nd stage address translation table 76b, the block number of the block into which the data to be processed has been written in the drive number of the SSD 60 into which the data has been written. Further, the RAID controller 50 updates the valid/invalid flag so as to indicate that at least one of the blocks belonging to each of the sets corresponding to the rows that store therein the block numbers holds valid data (step S31). In the case where the determination result at step S24 is in the affirmative, but a new stripe number was not determined at step S25 (step S30: No), the RAID controller 50 does not perform the process at step S31. After that, in the case where the process at steps S26 through S31 described above has not yet been performed on any of the pieces of data stored in the data buffer 75 (step S32: No), the RAID controller 50 performs the process at steps S26 through S31 while using such piece of data as a processing target.

When the process at steps S26 through S31 described above has been performed on all of the pieces of data stored in the data buffer 75 (step S32: Yes), the RAID controller 50 subsequently determines an SSD 60 into which the redundant information calculated at step S23 is to be written (step S33) and writes the redundant information into the determined SSD 60 (step S34). In the case where a new stripe number is determined at step S25 (step S35: Yes), the RAID controller 50 obtains the drive number of the SSD 60 into which the redundant information has been written at step S34, the block number of the block within the SSD 60, and the page number of the page in the block (step S36). After that, the RAID controller 50 stores, into the row corresponding to the new stripe number in the 2nd stage address translation table 76b, the block number of the block into which the redundant information has been written in the drive number of the SSD 60 into which the redundant information has been written (step S37).

Figure 7:
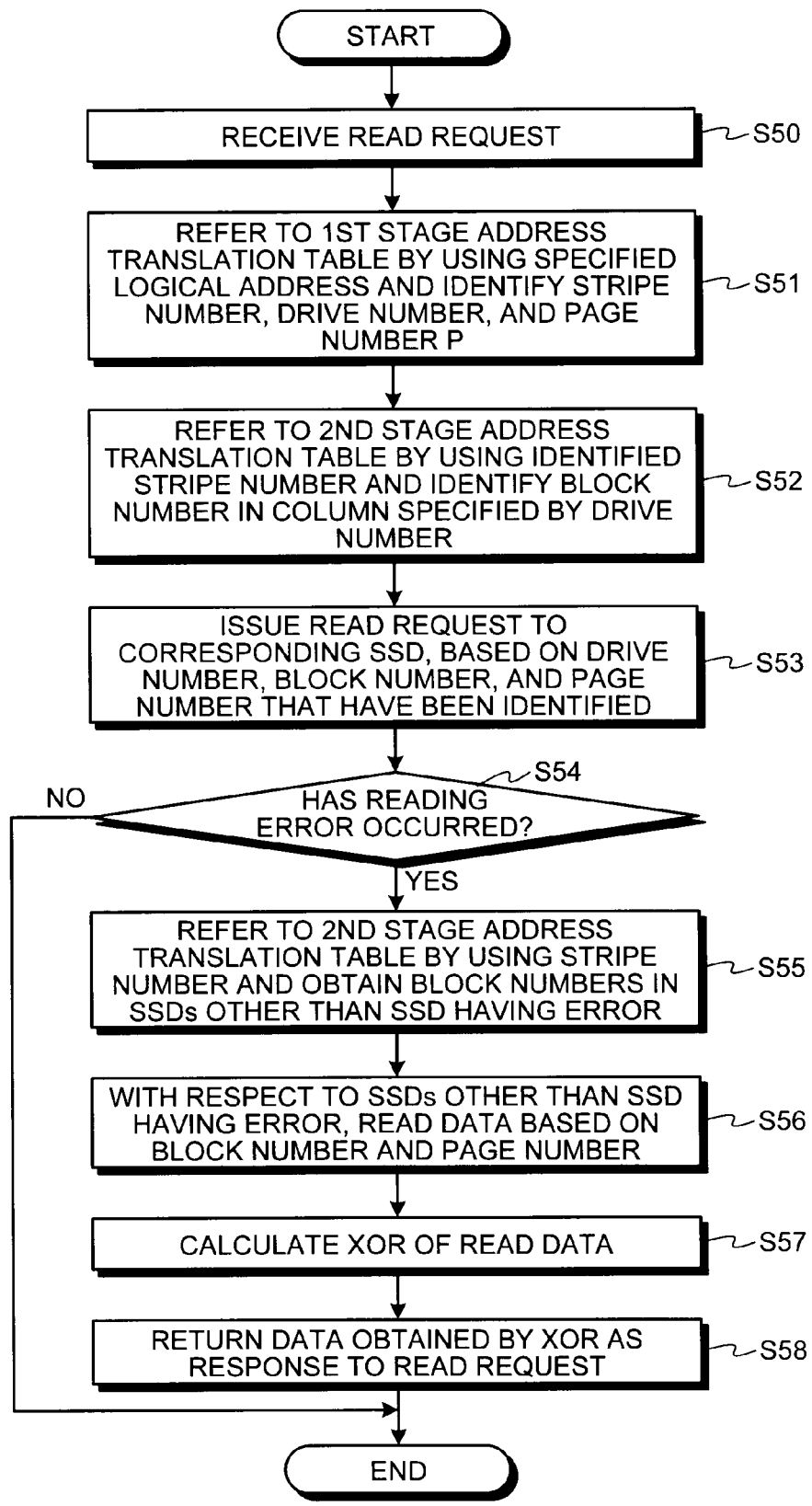
FIG. 7 is a flowchart of a procedure in a process to read data from an SSD.

Next, a procedure in a process performed by the RAID controller 50 to read data from an SSD 60 in response to a read command from the server 100 will be explained with reference to FIG. 7. In the present example, it is assumed that the size of the reading target data is equal to the page size. When receiving a read command transmitted from the server 100 (step S50), the RAID controller 50 refers to the 1st stage address translation table 76a within the management table 76 by using the logical address specified in the received read command, and reads and identifies the stripe number stored in association with the pre-replacement block address, the drive number of the SSD 60, and the page number (step S51). Subsequently, the RAID controller 50 refers to the 2nd stage address translation table 76b by using the stripe number determined at step S51 and reads and identifies the block number stored in association with the drive number determined at step S51 (step S52). After that, the RAID controller 50 requests the SSD 60 to which the drive number determined at step S51 is assigned to read data from the page that has the page number determined at step S51 and is included in the block having the block number determined at step S52 (step S53). In response to this request, the data is read from the SSD 60 and is forwarded to the RAID controller 50. As a result, the RAID controller 50 has obtained the reading target data.

Validity of the reading target data is ensured by a page ECC appended to the data. In other words, the RAID controller 50 detects an error in the data and can correct it by using the page ECC appended to the read data. In that situation, the RAID controller 50 is able to obtain the data having no errors (step S54: Yes) and is able to transmit the obtained data to the server 100 as a response to the read command. However, in the case where there may be an error that cannot be corrected with the page ECC, there is a possibility that a failure occurs in the RAID controller 50 and an abnormality occurs in the data. In that situation (step S54: No), the RAID controller 50 refers to the 2nd stage address translation table 76b by using the logical address that was used in the data reading operation and using the stripe number determined at step S51 and determines the block number associated with another drive number other than the drive number determined at step S51 (step S55). The RAID controller 50 then requests the SSDs 60 to read other pieces of data and redundant information written in the determined block number and in the page identified by the page number determined at step S51. In response to this request, the data and the redundant information are read from the SSDs 60 and forwarded to the RAID controller 50. As a result, the RAID controller 50 has obtained the reading target data as well as the other pieces of data and the redundant information constituting the error correction code (step S56). Further, by using the other pieces of data and the redundant information, the RAID controller 50 calculates an exclusive OR (XOR) and recovers the data having the uncorrectable error (step S57). As a result, the RAID controller 50 obtains recovered data with respect to the reading target data. The RAID controller 50 then transmits the reading target data thus obtained to the server 100 as a response to the read command (step S58).

Figure 8:
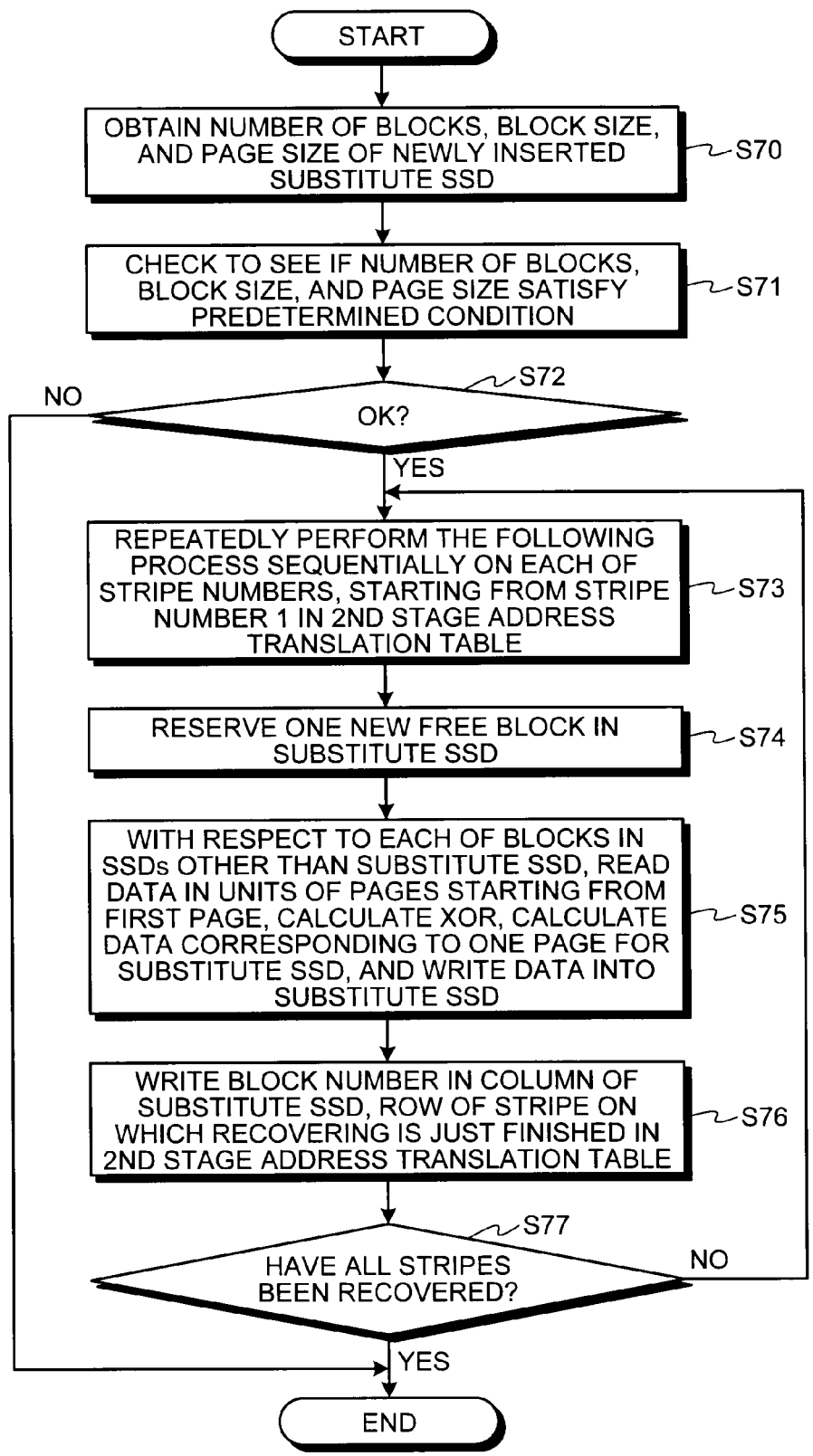
FIG. 8 is a flowchart regarding a replacement of an SSD used for structuring an error correction code.

Next, a procedure in a process that is performed by the RAID controller 50 to recover the data stored in a pre-replacement SSD into a substitute SSD, in the case where a failure occurs in at least one of the plurality of SSDs 60 structuring an error correction code and where the failed SSD 60 is replaced by another SSD, will be explained with reference to FIG. 8. First, the RAID controller 50 obtains information about the specifications (the block number, the block size, and the page size) of the substitute SSD (step S70). By using the information about the specifications obtained at step S70, the RAID controller 50 checks to see if the substitute SSD satisfies the predetermined condition (step S71). In the first embodiment, it is assumed that the block size and the page size are each the same for all the plurality of SSDs 60 used for constituting an error correction code. Thus, in the case where the block size and the page size of the substitute SSD are respectively equal to the block size and the page size of each of the other SSDs 60 used for constituting the error correction code and where the number of blocks of the substitute SSD is equal to or larger than the number of blocks of each of the other SSDs 60 used for constituting the error correction code, the RAID controller 50 determines that the predetermined condition is satisfied, so as to perform the process at step S71. In other words, the RAID controller 50 checks to see if the block size and the page size obtained at step S70 are respectively equal to the block size and the page size of each of the other SSDs 60 used for constituting the error correction code. In addition, the RAID controller 50 checks to see if the number of blocks obtained at step S70 is equal to or larger than the number of blocks of each of the other SSDs 60 used for constituting the error correction code. Alternatively, another arrangement is also acceptable in which the condition regarding the number of blocks is determined to be satisfied even if the number of blocks obtained at step S70 is smaller than the number of blocks of each of the other SSDs 60 used for constituting the error correction code, as long as the number of blocks obtained at step S70 is equal to or larger than the total number of stripes (which is smaller than the number of blocks) stored in the 2nd stage address translation table 76b.

When the RAID controller 50 is not able to confirm that the substitute SSD satisfies the predetermined condition (step S72: No), it is determined that an error occurs and the process is ended. On the contrary, when the RAID controller 50 confirms that the substitute SSD satisfies the predetermined condition (step S72: Yes), the RAID controller 50 determines that the data stored in the pre-replacement SSD is to be recovered into the substitute SSD. Subsequently, the RAID controller 50 changes the drive number of the pre-replacement SSD to the drive number assigned to the substitute SSD, within the storage area storing therein the 1st stage address translation table 76a and the storage area storing therein the 2nd stage address translation table 76b. After that, with respect to such stripe numbers associated with valid/invalid flags indicating "valid" among the stripe numbers stored in the storage area storing therein the 2nd stage address translation table 76b, the RAID controller 50 recovers, by using the error correction code, each of all the pieces of data written in the pre-replacement SSD and writes the recovered pieces of data into the substitute SSD. More specifically, from among the stripe numbers stored in the storage area storing therein the 2nd stage address translation table 76b, the RAID controller 50 sequentially selects, starting from the head, such a stripe number associated with a valid/invalid flag indicating "valid" as a processing target and obtains the block numbers corresponding to the drive numbers of the SSDs 60 associated with the stripe number selected as the processing target (step S73) and repeatedly performs the following processes: The RAID controller 50 reserves a free block in the substitute SSD and obtains the block number of the reserved free block (step S74). After that, the RAID controller 50 reads the valid data or the redundant information in units of pages in the order of the pages from each of the blocks identified with the block numbers corresponding to the SSDs 60 other than the pre-replacement SSD, among the SSDs 60 that have been obtained at step S73. The RAID controller 50 then calculates an exclusive OR (XOR) by using the data and the redundant information so as to recover the data written in the pre-replacement SSD and writes the recovered data into the free block that has been reserved within the substitute SSD at step S74 (step S75). After that, the RAID controller 50 updates the 2nd stage address translation table 76b by storing the block number obtained at step S74 as the block number corresponding to the drive number of the substitute SSD, into a row corresponding to the stripe number of the processing target, within the storage area storing therein the 2nd stage address translation table 76b (step S76). When the RAID controller 50 has performed the process described above on each of all the stripe numbers associated with valid/invalid flags indicating "valid", among the stripe numbers stored in the storage area storing therein the 2nd stage address translation table 76b (step S77: Yes), the process is ended.

As explained above, according to the first embodiment, it is possible to reduce the write penalty and to lower the frequency of updating parities, and it is therefore possible to prevent the usage life of the SSDs, which are semiconductor memory devices, from being shortened.

Further, according to the first embodiment, in response to the instruction related to the constitution of the error correction code, the management table 76 is constructed by using the information about the specifications of the SSDs 60 used for constituting the error correction code among the SSDs 60 connected to the RAID controller 50. Thus, of those SSDs 60, even if one of the SSDs 60 used for constituting the error correction code is replaced by a substitute SSD due to a failure or the like, it is possible to move the data into the substitute SSD and to reconstruct the management table 76. Consequently, regardless of whether a failure occurs in the SSDs 60, it is possible to read the data in response to a request from the server 100 with a high level of precision and to realize extremely high reliability.

Next, a semiconductor memory controlling device according to a second embodiment will be explained. Some of the features that are the same as those in the first embodiment described above will be either explained by using the same reference characters or omitted from the explanation.

According to the first embodiment described above, it is assumed that the block size and the page size are each the same for all the plurality of SSDs 60 used for constituting the error correction code; however, even if an error correction code is constituted by preparing the SSDs 60 for all of which the block size and the page size are each equal, if a failure occurs later and it becomes necessary to replace one of the SSDs 60 with a substitute SSD, it is not necessarily the case that it is possible to get an SSD 60 having the same block size and the same page size. For this reason, as the second embodiment, a configuration of the RAID controller 50 that makes it possible to constitute an error correction code even if the plurality of SSDs contain an SSD of which at least one of the block size and the page size is different from those of the other SSDs.

First, a translation that needs to be performed in the case where a substitute SSD having a different block size and/or a different page size is connected to the RAID controller 50 for the purpose of constituting an error correction code will be explained. The storage area storing therein the 1st stage address translation table 76a and the storage area storing therein the 2nd stage address translation table 76b that are explained in the first embodiment above are statically constructed based on the block size and the page size of each of the SSDs 60 used for constituting the error correction code. Thus, if a substitute SSD whose block size and/or page size are different from the block size and/or the page size used at the time of the construction is connected to the RAID controller 50 and is used for constituting the error correction code, it is necessary to translate the physical addresses in the SSD 60 (the pre-replacement SSD) before being replaced by the substitute SSD, which are stored in the storage area storing therein the 1st stage address translation table 76a and in the storage area storing therein the 2nd stage address translation table 76b, to the physical addresses in the substitute SSD.

The physical address translating processes is classified into nine possible situations in total, because, for the block size and for the page size, there are three possible situations where the value of the pre-replacement SSD is larger than the value of the substitute SSD, is equal to the value of the substitute SSD, and is smaller than the value of the substitute SSD.

In the following explanation, a block that is identified by the 1st stage address translation table 76a and the 2nd stage address translation table 76b will be referred to as a "pre-replacement block", and the block number thereof will be referred to as a "pre-replacement block number". A block of the substitute SSD will be referred to as a "substitute block", and the block number thereof will be referred to as a "substitute block number". Similarly, a page that is identified by the 1st stage address translation table 76a and the 2nd stage address translation table 76b will be referred to as a "pre-replacement page", and the page number thereof will be referred to as a "pre-replacement page number". A page of the substitute SSD will be referred to as a "substitute page", and the page number thereof will be referred to as a "substitute page number". Further, the block size and the page size that are used as the basis of the construction of the storage area storing therein the 1st stage address translation table 76a and the storage area storing therein the 2nd stage address translation table 76b will be referred to as the "pre-replacement block size" and the "pre-replacement page size", respectively. The block size and the page size of the substitute SSD will be referred to as the "substitute block size" and the "substitute page size", respectively.

Figure 9:
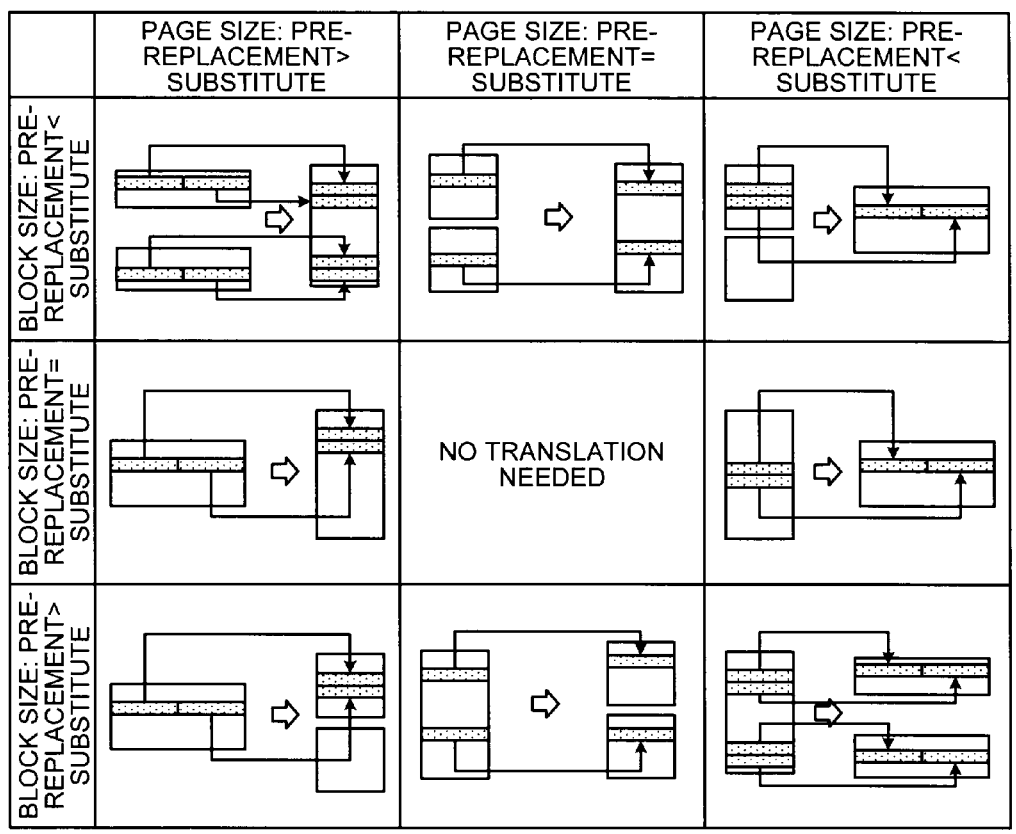
FIG. 9 is a table for explaining examples of nine possible situations of physical address translating processes according to a second embodiment.

FIG. 9 is a table for explaining examples of the nine possible situations of the physical address translating processes. In FIG. 9, as the examples in which the block size and/or the page size are different, situations where one is twice as large as the other are shown. These examples will be more specifically explained in the following sections. The one of the two does not necessarily have to be twice as large as the other, as long as the one is "a power of two" times larger than the other. The nine possible situations include a situation in which the block size and the page size are each equal between the pre-replacement SSD and the substitute SSD (see the second row in the second column in FIG. 9); however, because this situation is the same as the situation explained in the first embodiment above, the explanation thereof will be omitted.

First, a situation in which the substitute page size is equal to the pre-replacement page size, whereas the substitute block size is larger than the pre-replacement block size will be explained (see the first row in the second column in FIG. 9). In this situation, because two pre-replacement blocks are included in one substitute block, the pre-replacement blocks and the substitute blocks are brought into correspondence with one another with a ratio of 2 to 1. In the case where the number of substitute blocks is larger than the number of pre-replacement blocks, another arrangement is acceptable in which the pre-replacement blocks and the substitute blocks are brought into correspondence with one another with a ratio of 1 to 1, so that the pages within the substitute blocks are left over. In that situation, there is no need to perform the translating process.

Next, a situation in which the substitute page size is equal to the pre-replacement page size, whereas the substitute block size is smaller than the pre-replacement block size will be explained (see the third row in the second column in FIG. 9). In this situation, one pre-replacement block is divided into two substitute blocks. In other words, the pre-replacement blocks and the substitute blocks are brought into correspondence with one another with a ratio of 1 to 2.

Next, a situation in which the substitute page size is smaller than the pre-replacement page size, whereas the substitute block size is equal to the pre-replacement block size will be explained (see the second row in the first column in FIG. 9). In this situation, one pre-replacement page is divided into two substitute pages.

Next, a situation in which the substitute page size is larger than the pre-replacement page size, whereas the substitute block size is equal to the pre-replacement block size will be explained (see the second row in the third column in FIG. 9). In this situation, two pre-replacement pages are combined into one substitute page. Thus, the writing process for two pages needs to be performed in one time of writing, and it is therefore necessary to adjust the timing with which the writing process is performed.

Next, a situation in which the substitute page size is smaller than the pre-replacement page size, whereas the substitute block size is larger than the pre-replacement block size will be explained (see the first row in the first column in FIG. 9). In this situation, two pre-replacement blocks are included in one substitute block, and also, one pre-replacement page is divided into two substitute pages.

Next, a situation in which the substitute page size is larger than the pre-replacement page size, whereas the substitute block size is larger than the pre-replacement block size will be explained (see the first row in the third column in FIG. 9). In this situation, two pre-replacement blocks are able to fit in one substitute block, and also, two successive pre-replacement pages are combined into one substitute page. Thus, the writing process for two pages needs to be performed in one time of writing, and it is therefore necessary to adjust the timing with which the writing process is performed.

Next, a situation in which the substitute page size is smaller than the pre-replacement page size, whereas the substitute block size is smaller than the pre-replacement block size will be explained (see the third row in the first column in FIG. 9). In this situation, one pre-replacement block is divided into two substitute blocks, and also, one pre-replacement page is divided into two substitute pages.

Next, a situation in which the substitute page size is larger than the pre-replacement page size, whereas the substitute block size is smaller than the pre-replacement block size will be explained (see the third row in the third column in FIG. 9). In this situation, one pre-replacement block is divided into two substitute blocks, and also, two successive pre-replacement pages are combined into one substitute page. Thus, the writing process for two pages needs to be performed in one time of writing, and it is therefore necessary to adjust the timing with which the writing process is performed.

Figure 10:
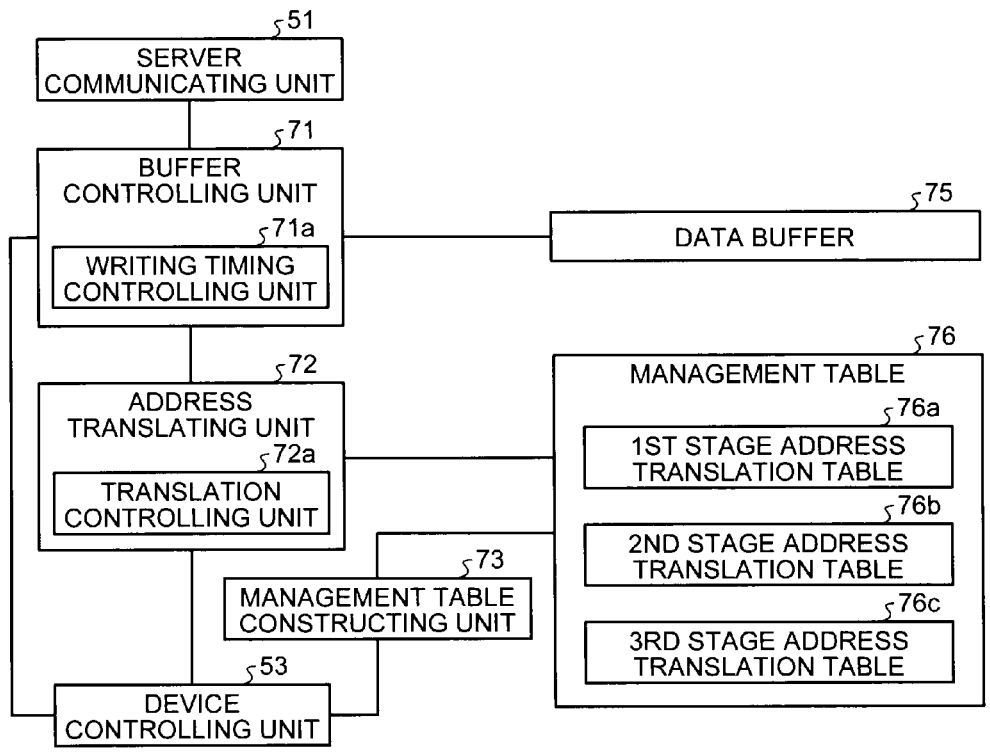
FIG. 10 is a diagram of another exemplary functional configuration of the RAID controller.

Next, a functional configuration of the RAID controller 50 according to the second embodiment for performing the physical address translating processes described above will be explained with reference to FIG. 10. According to the second embodiment, the buffer controlling unit 71 included in the RAID controller 50 includes a writing timing controlling unit 71*a*, while the address translating unit 72 includes a translation controlling unit 72*a*. Also, the management table 76 further includes a 3rd stage address translation table 76*c*.

In the first embodiment described above, the buffer controlling unit 71 receives a write command from the server communicating unit 51, and when the pieces of data are stored altogether in the data buffer 75 so as to be able to constitute the error correction code for one stripe, the write command requesting to write the pieces of data that are able to constitute the error correction code for the one stripe and the redundant information used for correcting errors in the pieces of data into the SSDs 60 is transmitted to the device controlling unit 53. In contrast, in the second embodiment, when the page size of the substitute SSD (the substitute page size) is larger than the pre-replacement page size, the writing operation for a plurality of stripes needs to be performed all at once. Thus, the writing timing controlling unit 71*a* included in the buffer controlling unit 71 causes the data buffer 75 to buffer data until the pieces of data used for generating the error correction code corresponding to the number of stripes according to the page size of the substitute SSD are stored altogether. When the pieces of data used for generating the error correction code corresponding to the number of stripes are stored altogether in the data buffer 75, the writing timing controlling unit 71*a* transmits, to the device controlling unit 53, a write command requesting to write the pieces of data used for generating the error correction code corresponding to the number of stripes and the redundant information used for correcting errors in the pieces of data into the SSDs 60.

Figure 11:
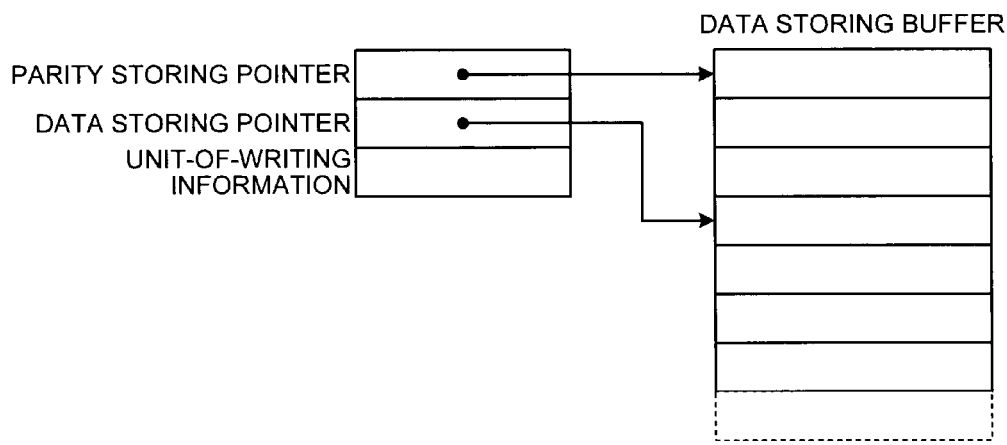
FIG. 11 is a drawing of examples of information managed by a writing timing controlling unit.

As shown in FIG. 11, the writing timing controlling unit 71*a* controls the timing with which the pieces of data and the redundant information are written into the SSDs 60, by managing, within the data buffer 75, a data storing buffer that stores therein the data and the redundant information in units of pages, a parity storing pointer that indicates the storing position of the redundant information, a data storing pointer that indicates the storing position of the data, and unit-of-writing information that indicates the number of stripes that are targets to be simultaneously written in one time of writing. A specific method of controlling will be explained later in a description of operations.

In the case where one of the SSDs 60 used for constituting the error correction code is to be replaced, if at least one of the block size and the page size of the substitute SSD are different from those of the SSD 60 being the pre-replacement SSD, the management table constructing unit 73 constructs a storage area to store therein the 3rd stage address translation table 76*c* so as to reconstruct the management table. The 3rd stage address translation table 76*c* is information that indicates an association between the pre-replacement blocks of the pre-replacement SSD and the substitute blocks of the substitute SSD so that, in the case where the block size of the substitute SSD is different from the block size of the SSD 60 being the pre-replacement SSD, it is possible to translate the physical addresses exclusively for the substitute SSD. A specific method for constructing the storage area storing therein the 3rd stage address translation table 76*c* will be explained later in a description of operations.

The translation controlling unit 72*a* included in the address translating unit 72 refers to the 3rd stage address translation table 76*c* and corrects the pre-replacement block number and the pre-replacement page number of the pre-replacement SSD to be suitable for the substitute SSD, so as to translate these numbers into the substitute block number and the substitute page number.

FIG. 12 is a diagram of an exemplary internal configuration of the translation controlling unit 72*a*. The translation controlling unit 72*a* includes the block number translating unit 72*b* and a page number translating unit 72*c*. The block number translating unit 72*b* performs a translating process to obtain the substitute block number and an intermediary page number by using the block number (the pre-replacement block number) and the page number (the pre-replacement page number) that have been obtained from the 1st stage address translation table 76*a* and the 2nd stage address translation table 76*b* and outputs the substitute block number and the intermediary page number. The page number translating unit 72*c* performs a translating process to obtain the substitute page number by using the substitute block number and the intermediary page number that have been output by the block number translating unit 72*b* and outputs the substitute page number.

Here, the translating process performed by the block number translating unit 72*b* will be explained with reference to FIG. 13. This translating process varies depending on which one of the pre-replacement block size and the substitute block size is larger. When the pre-replacement block size is larger than the substitute block size, one pre-replacement block is divided into a plurality of substitute blocks. In other words, the pre-replacement blocks and the substitute blocks are brought into correspondence with one another with a ratio of 1 to 2. Thus, a storage area is constructed so as to store therein the 3rd stage address translation table 76*c* of a "pre-replacement>substitute type" that uses the pre-replacement block number as a key and has 2^N columns, where 2^N is a block division number (i.e., a quotient obtained by dividing the pre-replacement block size by the substitute block size). Into the constructed storage area, the association between the pre-replacement block numbers of the pre-replacement blocks and the substitute block numbers of the substitute blocks is stored. By referring to the 3rd stage address translation table 76*c* while using the pre-replacement block number as a key, the block number translating unit 72*b* selects a column based on upper N bits of the pre-replacement page number so as to obtain and output the substitute block number. Further, the block number translating unit 72*b* outputs the lower bits obtained by eliminating the upper N bits from the pre-replacement page number, as the intermediary page number.

In contrast, when the pre-replacement block size is smaller than the substitute block size, a plurality of pre-replacement blocks are included in one substitute block. Into the storage area storing therein the 3rd stage address translation table 76*c* of a "physical>logical type" that is constructed in this situation, the substitute block number of the substitute block to which a certain pre-replacement block is assigned and an offset from the head of the substitute block are stored. By referring to the 3rd stage address translation table 76*c* while using the pre-replacement block number as a key, the block number translating unit 72*b* selects a column based on upper N bits of the pre-replacement page number so as to obtain and output the substitute block number and the offset. Further, the block number translating unit 72*b* obtains the intermediary page number by adding the offset to the pre-replacement page number and outputs the obtained intermediary page number.

Further, when the pre-replacement block size is equal to the substitute block size, the 3rd stage address translation table 76c is not generated, and the block number translating unit 72b does not need to perform the translating process. In that situation, the block number translating unit 72b outputs, without performing any translating process, the pre-replacement block number as the substitute block number, and the pre-replacement page number as the intermediary page number.

Next, a translating process performed by the page number translating unit 72c will be explained with reference to FIG. 14. This translating process varies depending on which one of the pre-replacement page size and the substitute page size is larger. When the pre-replacement page size is larger than the substitute page size, the page number translating unit 72c shifts the intermediary page number output by the block number translating unit 72b to the left by M bits where a page division number (a quotient obtained by dividing the pre-replacement page size by the substitute page size) is expressed as 2^M, so as to obtain the page number of the page at the head of the plurality of pages that have been assigned and to output the obtained page number as the substitute page number.

As another example, when the pre-replacement page size is smaller than the substitute page size, the page number translating unit 72c shifts the intermediary page number output by the block number translating unit 72b to the right by M bits where a page division number (a quotient obtained by dividing the substitute page size by the pre-replacement page size) is expressed as 2^M, so as to obtain a substitute page number that has been assigned and to obtain an offset used for identifying a position within the substitute page identified by the obtained substitute page number while using the lower M bits of the intermediary page number, and the page number translating unit 72c subsequently outputs the substitute page number and the offset.

Figure 15:
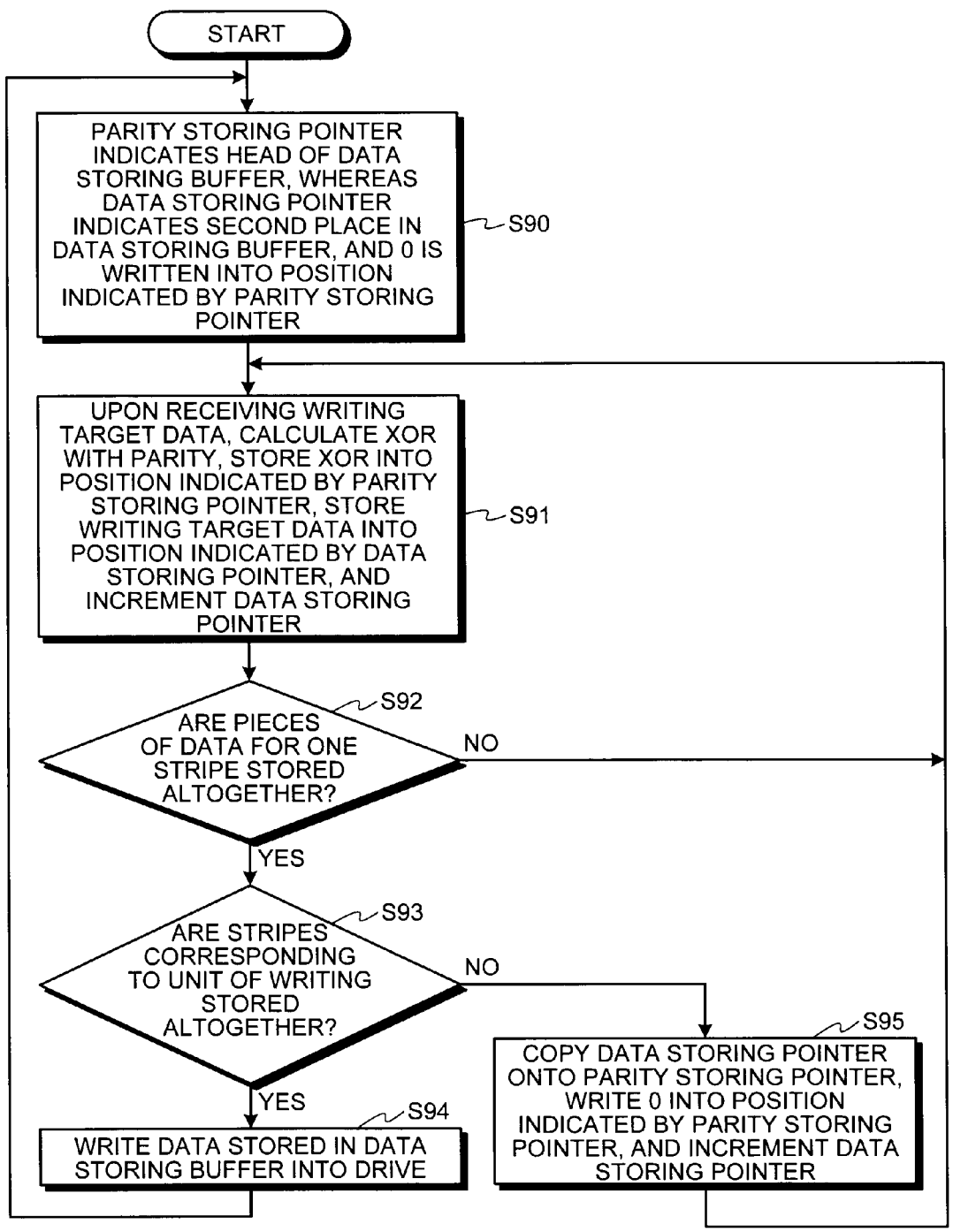
FIG. 15 is a flowchart of a procedure in a process to control writing timing.

Next, procedures in processes performed by the RAID controller 50 according to the second embodiment will be explained. First, a procedure in a process performed by the RAID controller 50 to control the timing with which the data and the redundant information are written into the SSDs 60 while using a function of the writing timing controlling unit 71a will be explained with reference to FIG. 15. The writing timing controlling unit 71a first initializes the parity storing pointer, the data storing pointer, and the unit-of-writing information by setting the unit-of-writing information so as to indicate that the number of stripes is "1", setting the parity storing pointer so as to indicate the head of the data storing buffer, setting the value of the redundant information to be "0", and setting the data storing pointer so as to indicate the second page in the data storing buffer (step S90). Subsequently, when receiving a write command from the server communicating unit 51, the writing timing controlling unit 71a stores the data requested to be written by the write command, into the storing position indicated by the data storing pointer, calculates an exclusive OR with the redundant information (which is "0" in the initial state), stores the calculated exclusive OR into the storing position indicated by the parity storing pointer, and increments the data storing pointer by 1 (step S91). After that, every time the pieces of data used for generating an error correction code for one stripe are stored altogether in the data buffer, that is, every time the number of pieces of data stored in the data storing buffer reaches a multiple of a predetermined number (step S92: Yes), the writing timing controlling unit 71a refers to the number of stripes indicated by the unit-of-writing information and determines whether the number of pieces of data stored in the data buffer 75 has reached the number of stripes. When the number of pieces of data has reached the number of stripes (step S93: Yes), the writing timing controlling unit 71a transmits, to the device controlling unit 53, a write command requesting to write the pieces of data used for generating an error correction code corresponding to the number of stripes and the redundant information used for correcting errors in the pieces of data into the SSD 60, initializes the parity storing pointer so as to indicate the head of the data storing buffer, initializes and stores the redundant information being set to "0", and initializes the data storing pointer so as to indicate the second page in the data storing buffer (step S94). On the contrary, when the number of pieces of data stored in the data buffer 75 has not reached the number of stripes indicated by the unit-of-writing information (step S93: No), the writing timing controlling unit 71a sets the parity storing pointer so that the parity storing pointer indicates the storing position indicated by the data storing pointer, stores "0" that has been initialized as redundant information into the storing position indicated by the parity storing pointer, and increments the data storing pointer by "1" (step S95).

Figure 16:
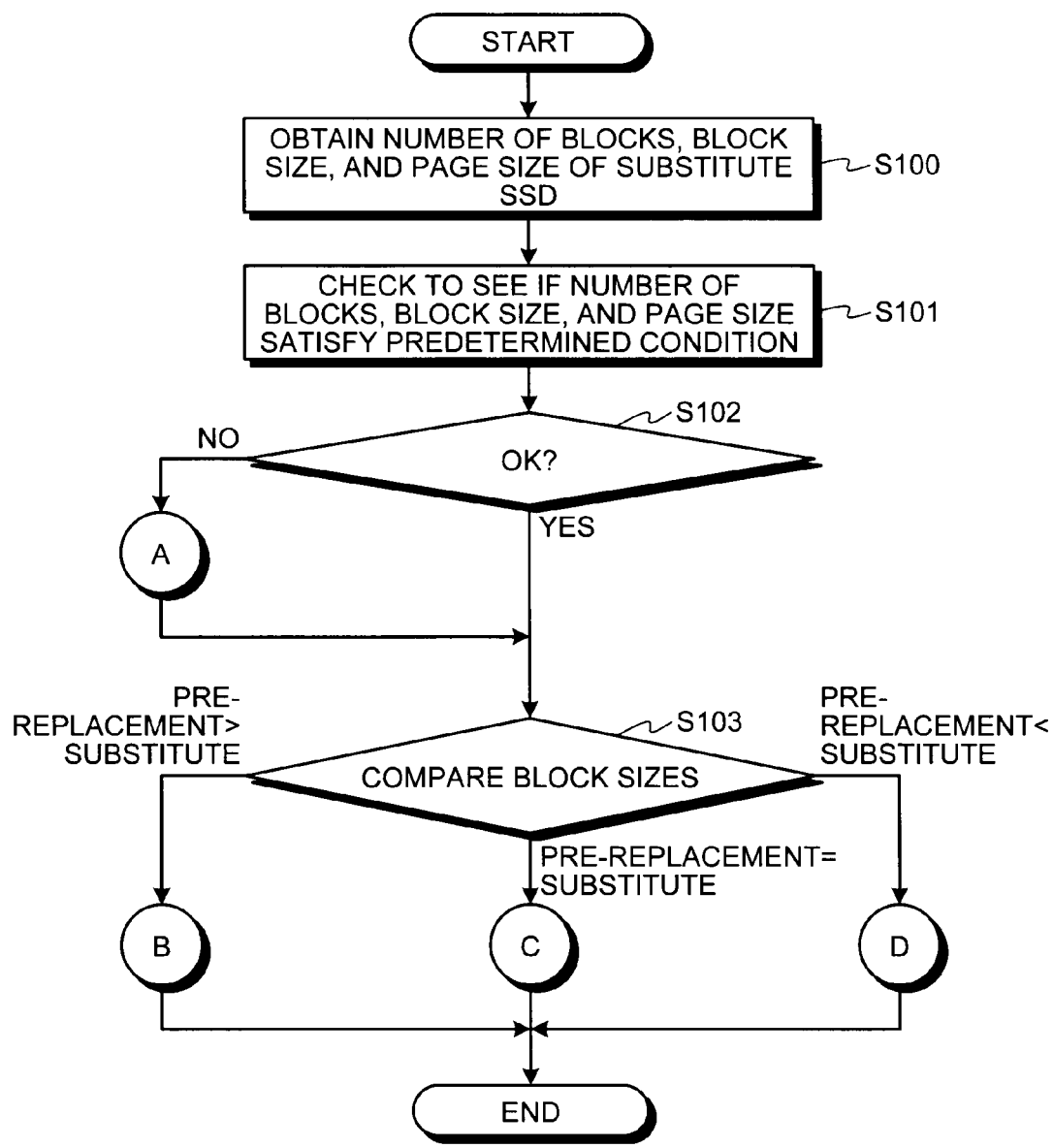
FIG. 16 is a flowchart of a procedure in a process to recover data into a substitute SSD.

Next, a procedure in a process performed by the RAID controller 50 to recover the data stored in the pre-replacement SSD into the substitute SSD will be explained with reference to FIG. 16. The RAID controller 50 obtains the information about the specifications (the number of blocks, the block size, and the page size) of the substitute SSD by using a function of the management table constructing unit 73 (step S100). In the case where the capacity of the substitute SSD is smaller than the capacity of each of the other SSDs 60 used for constituting the error correction code, it is impossible to re-structure the error correction code by using the substitute SSD. Thus, it is necessary to perform a process to check to see if the capacity of the substitute SSD is equal to or larger than the capacity of each of the other SSDs 60; however, this checking process is omitted from FIG. 16. Subsequently, the RAID controller 50 compares the block size (the substitute block size) and the page size (the substitute page size) obtained at step S100 with the pre-replacement block size, which is the block size of the pre-replacement SSD, and with the pre-replacement page size, which is the page size of the pre-replacement SSD, respectively. Further, the RAID controller 50 checks to see if the number of blocks obtained at step S100 is equal to or larger than the number of blocks of each of the other SSDs 60 used for constituting the error correction code (step S101). Alternatively, another arrangement is acceptable in which the condition regarding the number of blocks is determined to be satisfied even if the number of blocks obtained at step S100 is smaller than the number of blocks of each of the other SSDs 60 used for constituting the error correction code, as long as the number of blocks is equal to or larger than the total number of stripes (which is smaller than the number of blocks) stored in the 2nd stage address translation table 76b. In the case where at least one of the substitute block size and the substitute page size is different from the comparison target thereof (step S102: No), the RAID controller 50 performs a process A to generate the 3rd stage address translation table 76c, and the process proceeds to step S103. The procedure in the process A will be explained later. In the case where both of the substitute block size and the substitute page size are equal to the comparison targets thereof (step S102: Yes), the RAID controller 50 does not perform the process A, and the process proceeds to step S103.

At step S103, the RAID controller 50 performs a comparing process to determine which is larger between the pre-replacement block size and the substitute block size. When the pre-replacement block size is larger than the substitute block size, the RAID controller 50 performs a process B.

When the pre-replacement block size is equal to the substitute block size, the RAID controller 50 performs a process C. Further, when the pre-replacement block size is smaller than the substitute block size, the RAID controller 50 performs a process D.

Figure 17:
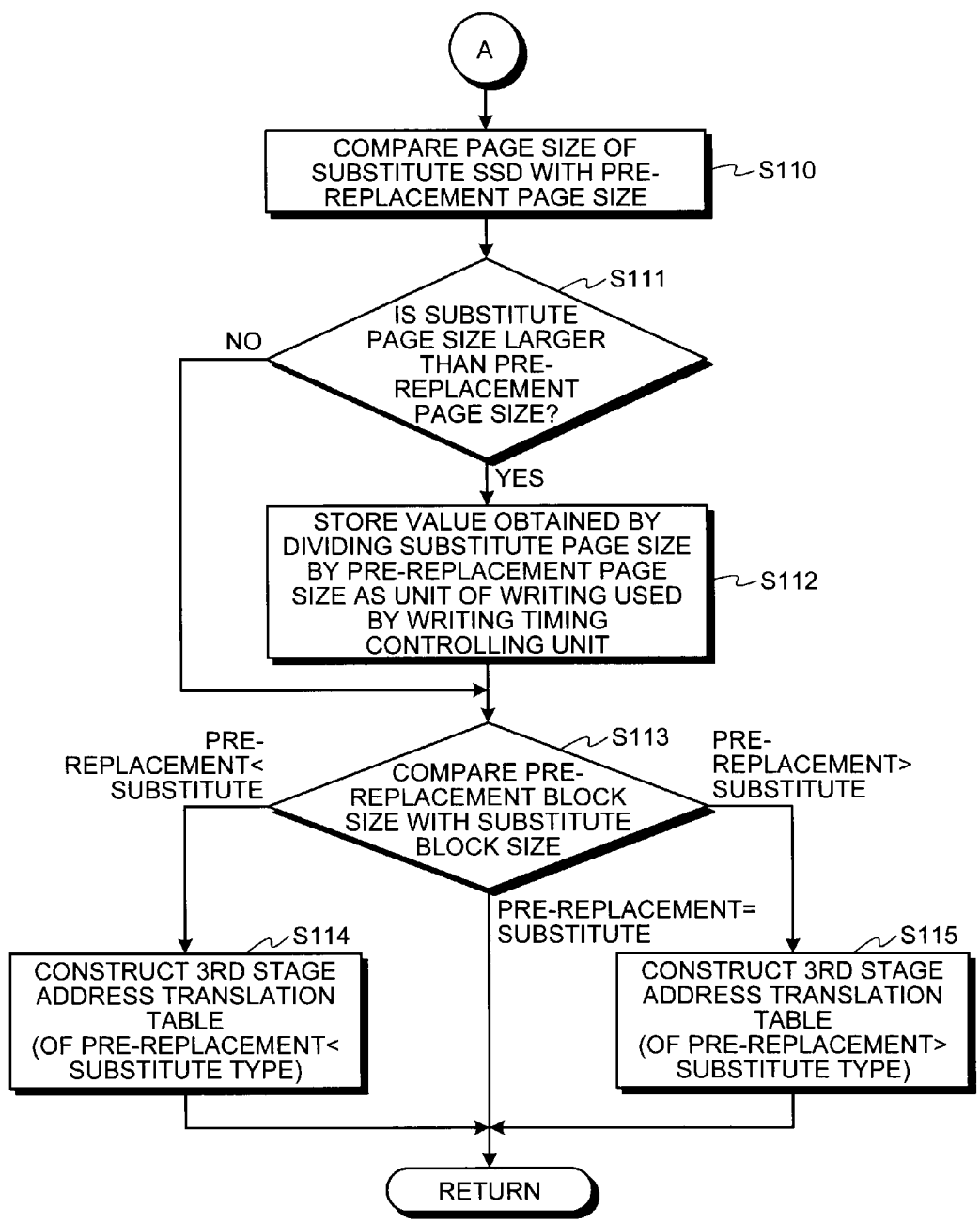
FIG. 17 is a flowchart of a procedure in a process A.

Next, the process A to generate the 3rd stage address translation table 76c will be explained with reference to FIG. 17. The RAID controller 50 performs a comparing process to determine which is larger between the page size of the substitute SSD (the substitute page size) and the pre-replacement page size (step S110). When the substitute page size is larger than the pre-replacement page size (step S111: Yes), the RAID controller 50 stores unit-of-writing information indicating a value (quotient) obtained by dividing the substitute page size by the pre-replacement page size into the data buffer 75 (step S112), and the process proceeds to step S113. Also, when the substitute page size is equal to or smaller than the pre-replacement page size (step S111: No), the process proceeds to step S113. At step S113, the RAID controller 50 performs a comparing process to determine which one is larger between the pre-replacement block size and the substitute block size. When the pre-replacement block size is smaller than the substitute block size, the RAID controller 50 constructs a storage area storing therein the 3rd stage address translation table 76c, by generating the 3rd stage address translation table 76c of the "pre-replacement<substitute type" and storing the table into the storage area of the memory 54 (step S114). On the contrary, when the pre-replacement block size is larger than the substitute block size, the RAID controller 50 constructs a storage area storing therein the 3rd stage address translation table 76c, by generating the 3rd stage address translation table 76c of the "pre-replacement>substitute type" and storing the table into the storage area of the memory 54 (step S115). Further, when the pre-replacement block size is equal to the substitute block size, it is not necessary to generate the 3rd stage address translation table 76c. In that situation, the pre-replacement block number is equal to the substitute block number, without performing any translating process.

Figure 18:
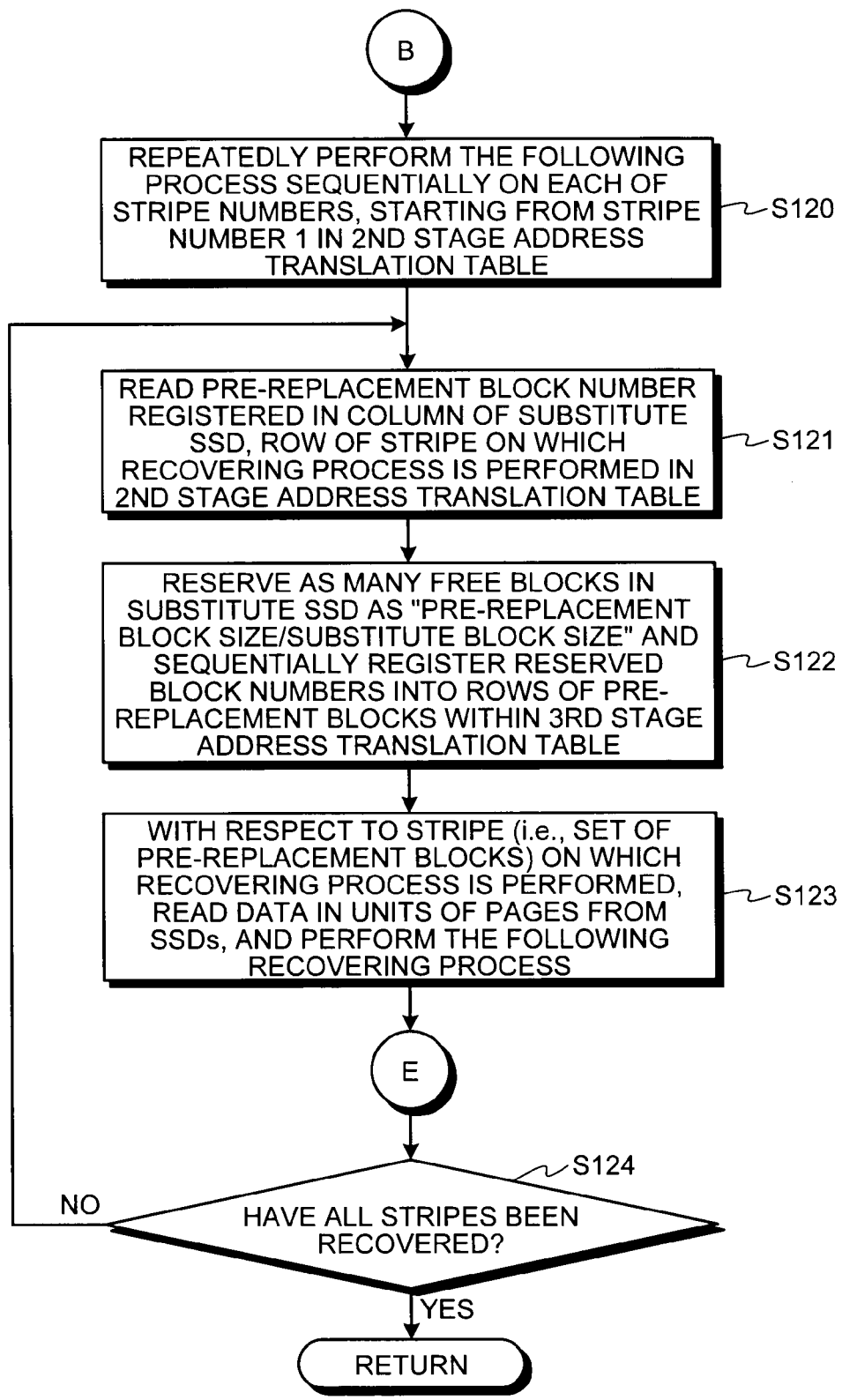
FIG. 18 is a flowchart of a procedure in a process B.

Next, a procedure in the process B that is performed in the case where the pre-replacement block size is larger than the substitute block size will be explained with reference to FIG. 18. In this situation, as explained above, the 3rd stage address translation table 76c of the "pre-replacement>substitute type" is stored in the memory 54. The RAID controller 50 sets stripe numbers each associated with a valid/invalid flag indicating "valid" as targets to be processed, and performs the following process sequentially on each of the stripe numbers, starting from the head. First, the RAID controller 50 obtains the block number (the pre-replacement block number) associated with the drive number of the pre-replacement SSD associated with the stripe number being the processing target (step S121) and stores the obtained pre-replacement block number into the storage area storing therein the 3rd stage address translation table 76c. Subsequently, the RAID controller 50 reserves, within the substitute SSD, as many free blocks as the quotient obtained by dividing the pre-replacement block size by the substitute block size, obtains the block numbers of the free blocks, stores the obtained block numbers into the storage area storing therein the 3rd stage address translation table 76c, as the substitute block numbers that correspond to the pre-replacement block numbers within the 3rd stage address translation table 76c (step S122). After that, the RAID controller 50 sequentially reads the data or the redundant information in units of pages, starting from the page at the head of each of the blocks identified with the block numbers associated with the drive numbers of the SSDs other than the pre-replacement SSD associated with the stripe number being the processing target, and performs the process E which is to calculate the data to be recovered into the substitute SSD. The RAID controller 50 performs the process described above on each of all the stripe numbers being the processing targets. When the RAID controller 50 has finished performing this process (step S124: Yes), all of the data stored in the pre-replacement SSD has been recovered into the substitute SSD.

Figure 19:
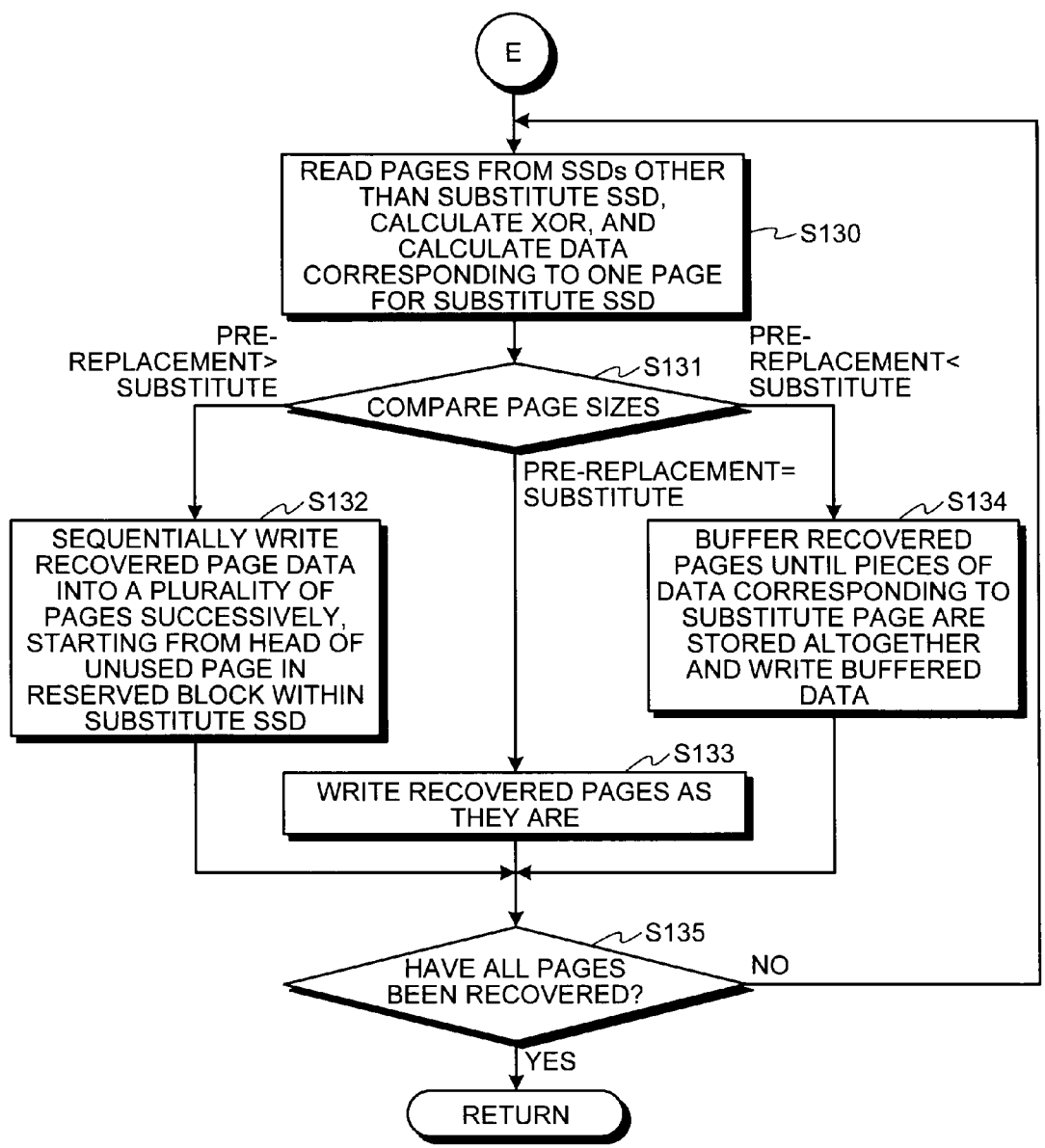
FIG. 19 is a flowchart of a procedure in a process E.

Next, the process E to calculate the data to be recovered into the substitute SSD will be explained with reference to FIG. 19. The RAID controller 50 calculates an exclusive OR by using the data or the redundant information thus read at step S123 shown in FIG. 18 and calculates the data that is in units of pages and is stored in the pre-replacement SSD (step S130). After that, the RAID controller 50 performs a comparing process to determine which is larger between the pre-replacement page size and the substitute page size (step S131). When the pre-replacement page size is larger than the substitute page size, the RAID controller 50 sequentially writes the data calculated at step S130 into a plurality of pages successively (into as many pages as the quotient obtained by dividing the pre-replacement page size by the substitute page size), starting from the head of an unwritten page in the free block reserved within the substitute SSD (step S132). The unwritten page within the free block may be indicated by the write pointer explained above.

In contrast, when the pre-replacement page size is equal to the substitute page size, the pre-replacement pages and the substitute pages are in a one-to-one correspondence. Thus, the RAID controller 50 writes the data calculated at step S130 into the head of an unwritten page in the free block reserved within the substitute SSD (step S133). Further, when the pre-replacement page size is smaller than the substitute page size, the data corresponding to one page calculated at step S130 is not enough to fill the substitute page, the RAID controller 50 causes the data buffer 75 to buffer data until pieces of data corresponding to the pages that fill the substitute page are stored altogether. When the pieces of data corresponding to the pages that fill the substitute page are stored altogether, the RAID controller 50 writes the data into unwritten pages in the free block reserved in the substitute SSD (step S134). The RAID controller 50 performs the process described above on each of all the stripe numbers being the processing targets. When the RAID controller 50 has finished performing this process (step S135: Yes), all of the data stored in the pre-replacement SSD has been recovered into the substitute SSD.

Figure 20:
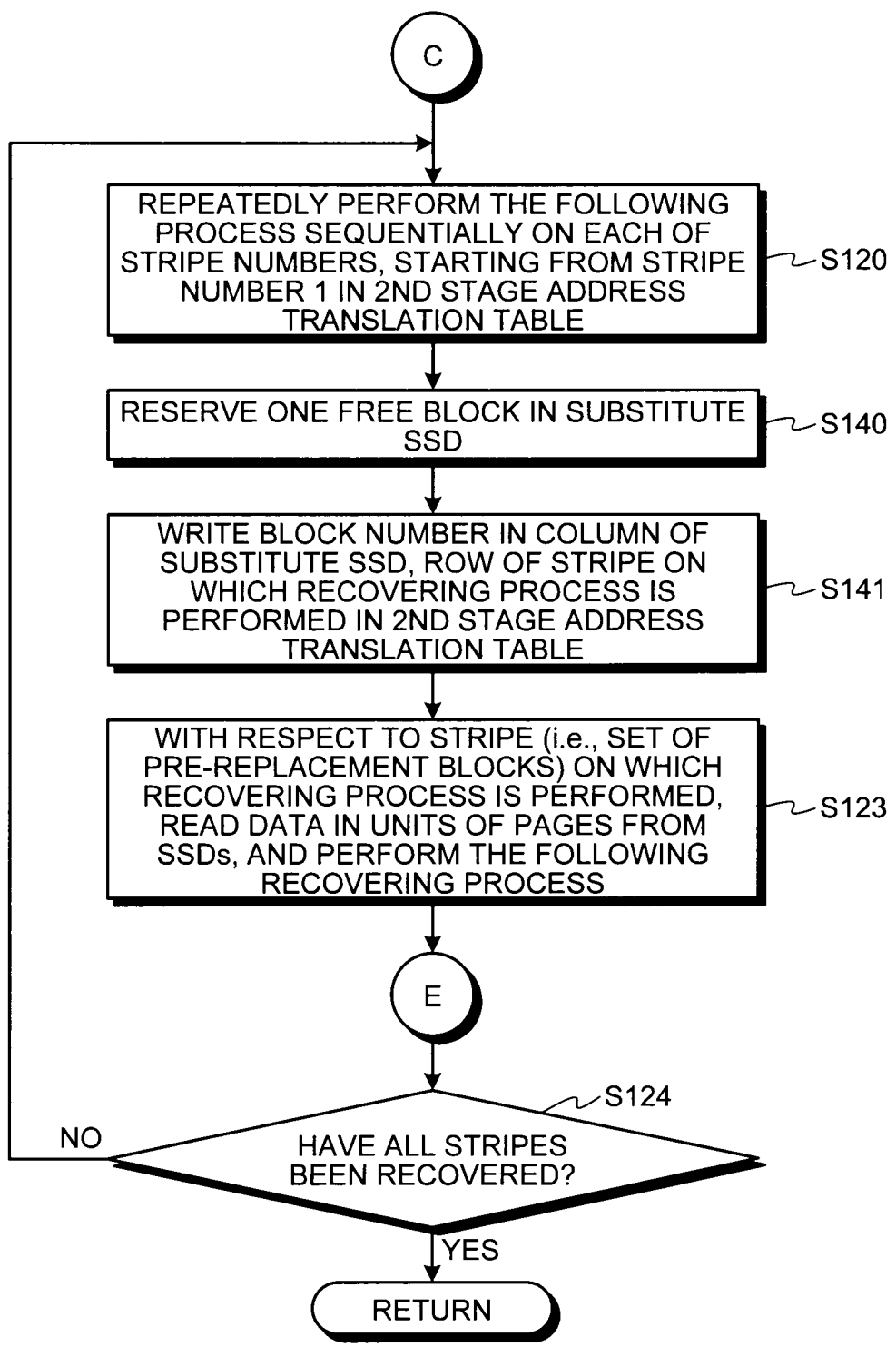
FIG. 20 is a flowchart of a procedure in a process C.

Next, a procedure in the process C that is performed in the case where the pre-replacement block size is equal to the substitute block size will be explained with reference to FIG. 20. In this situation, as explained above, the 3rd stage address translation table 76c is not generated, and the pre-replacement block number is equal to the substitute block number, without performing any translating process. Alternatively, in that situation, an arrangement is acceptable in which the RAID controller 50 changes, in advance, the drive number of the pre-replacement SSD associated with the stripe number stored in the storage area storing therein the 2nd stage address translation table 76b, to the drive number of the substitute SSD. The process at step S120 is the same as the process performed during the process B described above. At step S140, the RAID controller 50 reserves one free block in the substitute SSD and stores the block number of the reserved free block as the block number in the substitute SSD associated with the stripe number being the processing target stored in the storage area storing therein the 2nd stage address translation table 76*b* (step S141). The process at step S123 is the same as the process performed during the process B described above. The process E has also been explained above. The RAID controller 50 performs the process described above on each of all the stripe numbers being the processing targets. When the RAID controller 50 has finished performing this process (step S124: Yes), all of the data stored in the pre-replacement SSD has been recovered into the substitute SSD.

Figure 21:
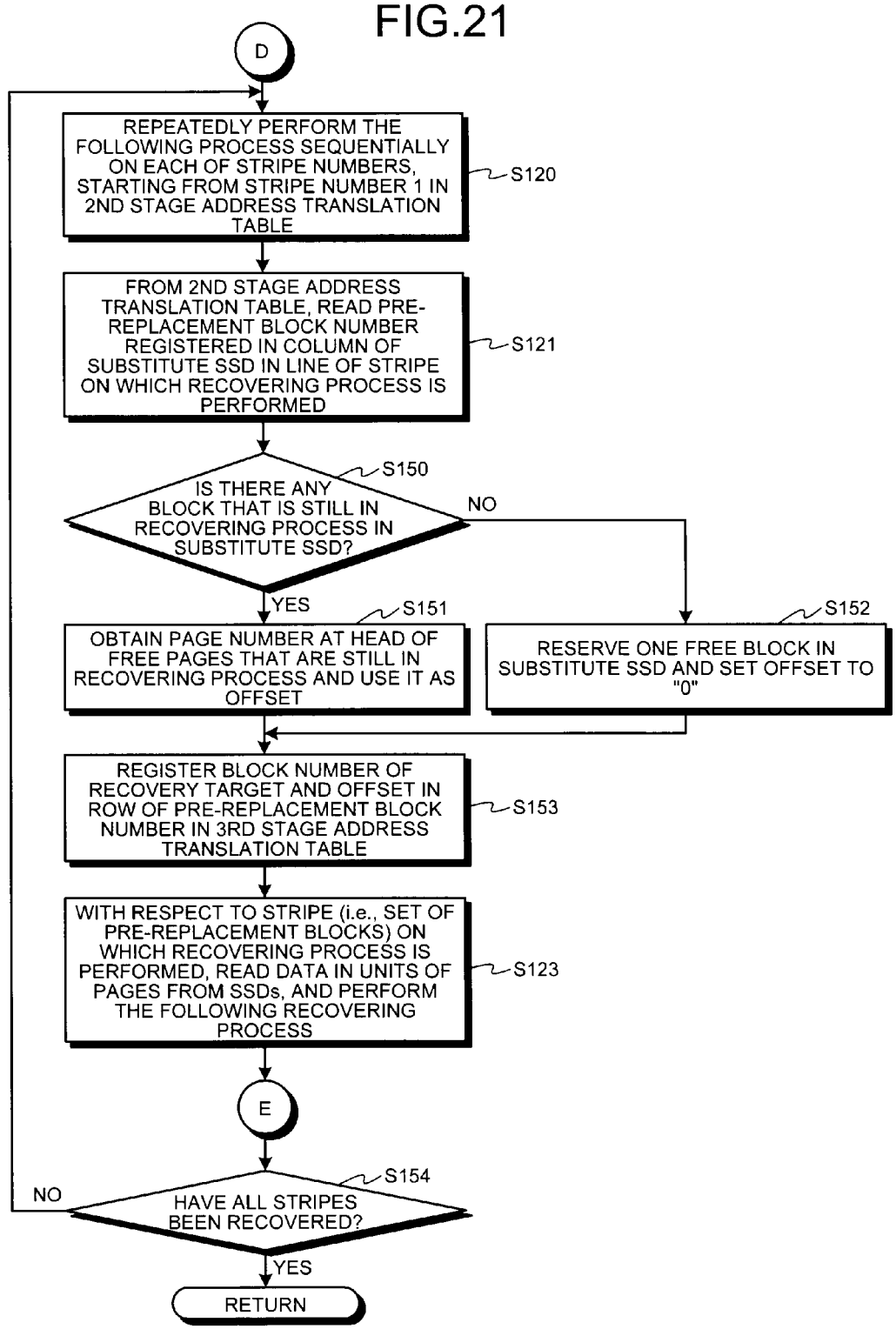
FIG. 21 is a flowchart of a procedure in a process D.

Next, a procedure in the process D that is performed in the case where the pre-replacement block size is smaller than the substitute block size will be explained with reference to FIG. 21. In this situation, as explained above, the 3rd stage address translation table 76*c* of the "physical>logical type" is stored in the memory 54. The process performed at steps S120 and S121 is the same as the process performed during the process B described above. In this situation, because a plurality of pre-replacement blocks are assigned to one substitute block, in the case where one free block is reserved in the substitute SSD, the data to be recovered in correspondence with a plurality of stripe numbers is to be written into the reserved free block. In other words, even if the data that has been recovered in correspondence with the one stripe number is written into one block within the substitute SSD, one or more unwritten pages still remain in the block. Thus, the RAID controller 50 has to write the data to be recovered in correspondence with another stripe number into those pages. For this reason, at step S150, the RAID controller 50 determines whether the free block reserved in the substitute SSD into which the data is to be recovered in correspondence with the stripe number still has one or more unwritten pages or the free block no longer has any unwritten page as a result of the writing of the data that has been recovered in correspondence with the stripe number being the immediately-preceding processing target. In the case where the free block reserved in the substitute SSD no longer has any unwritten page (step S150: No), the RAID controller 50 reserves one new free block in the substitute SSD and obtains the block number (the substitute block number) of the reserved free block (step S152), and the process proceeds to step S153. Because the data is written into this block starting from the page at the head, the RAID controller 50 obtains an offset being set to "0". It should be noted that, even when the data is recovered in correspondence with the stripe number being a processing target at the very beginning, the RAID controller 50 also performs the process at step S152. In contrast, in the case where there is a block that still has one or more unwritten pages (step S150: Yes), the RAID controller 50 obtains the block number (the substitute block number) of the block, obtains the page number of the page at the head of the unwritten pages in the block, and uses the obtained page number as an offset (step S151). The process then proceeds to step S153. At step S153, the RAID controller 50 stores the substitute block number and the offset into the storage area storing therein the 3rd stage address translation table 76*c* so as to be associated with the block number (the pre-replacement block number) obtained at step S121. The process performed at step S123 is the same as the process performed during the process B described above. The RAID controller 50 performs the process described above on each of all the stripe numbers being the processing targets. When the RAID controller 50 has finished performing this process (step S124), all of the data stored in the pre-replacement SSD has been recovered into the substitute SSD.

As explained above, according to the second embodiment, it is possible to structure the error correction code by using the substitute SSD of which at least one of the block size and the page size is different from those of each of the other SSDs.

As explained above, according to the first and the second embodiments, it is possible to reduce the write penalty and to lower the frequency of updating the parities, and it is therefore possible to prevent the usage life of the SSDs, which are semiconductor memory devices, from being shortened.

The present invention is not limited to the exemplary embodiments described above. At the implementation stage of the invention, it is possible to materialize the present invention while applying modifications to the constituent elements thereof without departing from the gist thereof. In addition, it is possible to form various inventions by combining, as necessary, two or more of the constituent elements disclosed in the exemplary embodiments. For example, it is acceptable to omit some of the constituent elements described in the exemplary embodiments. Further, it is acceptable to combine, as necessary, the constituent elements from mutually different ones of the exemplary embodiments. Furthermore, it is acceptable to apply various types of modifications as described below.

In the exemplary embodiments described above, another arrangement is acceptable in which, the various types of computer programs executed by the RAID controller 50 are stored in a computer connected to a network like the Internet, so that the various types of computer programs are provided as being downloaded via the network. Yet another arrangement is acceptable in which each of the various types of computer programs is provided as a computer program product that has been recorded on a computer-readable recording medium such as a Compact Disk Read-Only Memory (CD-ROM), a flexible disk (FD), a Compact Disk Recordable (CD-R), a Digital Versatile Disk (DVD), or the like, in a file that is in an installable format or in an executable format.

In the exemplary embodiments described above, the RAID controller 50 receives the instruction related to the constitution of the error correction code when initializing the management table 76; however, the present invention is not limited to this example. Another arrangement is acceptable in which the 1st stage address translation table 76*a* and the 2nd stage address translation table 76*b* are generated based on a method that is determined in advance in relation to the constitution of the error correction code.

Figure 22:
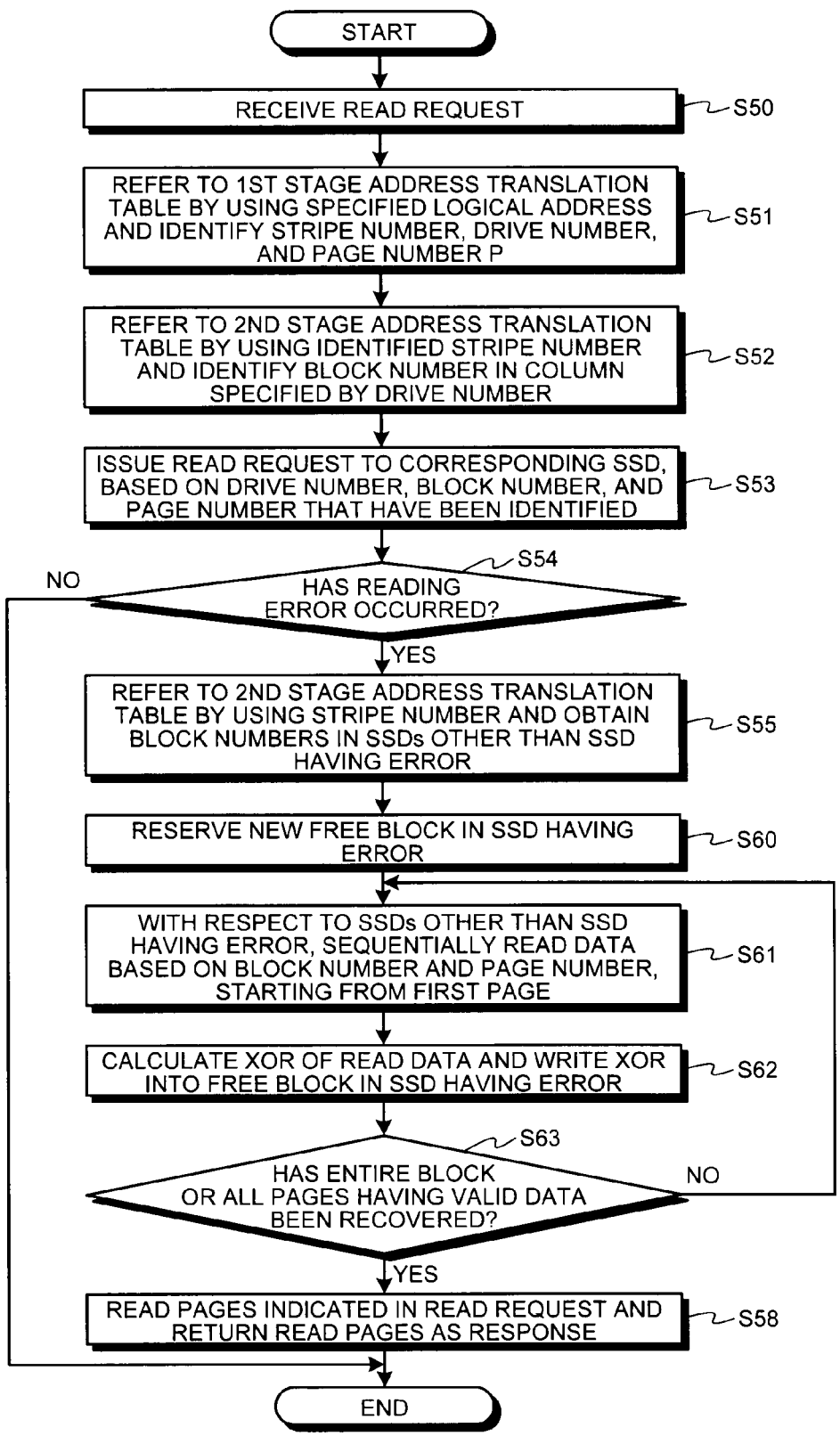
FIG. 22 is a flowchart of a procedure in a process to read data according to a modification example.

In the exemplary embodiments described above, another arrangement is acceptable in which, when the reading target data has an error, the RAID controller 50 repairs the entirety of the block (hereinafter, the "error block") into which the data has been written. FIG. 22 is a flowchart of a procedure in the process to read the data according to this modification example. The process performed at steps S51 through S55 is the same as the process performed in the first embodiment. After performing the process at step S55, the RAID controller 50 reserves, at step S60, a new free block in the SSD 60 in which the reading target data having an error has been written. After that, the RAID controller 50 requests the SSDs 60, in the order of the pages, to read the other pieces of data and the redundant information that have been written in the block identified by the block number determined at step S55. In response to this request, the pieces of data and the redundant information are read from the SSDs 60 in the order of the pages and forwarded to the RAID controller 50. As a result, of the data constituting the error correction code, the RAID controller 50 obtains the other pieces of data and the redundant information, except for the data written in the error block (step S61). After that, the RAID controller 50 calculates an exclusive OR (XOR) by using the other pieces of data and the redundant information, recovers the data that had the uncorrectable error, and writes the recovered data into the free block that has been reserved at step S60 (step S62). Subsequently, the RAID controller 50 performs the process at steps S61 and S62 in the order of pages on each of all the pieces of valid data that have been written in the error block. When having finished performing this process (step S63: Yes), the RAID controller 50 transmits, at step S58, the data for which the reading process has been requested and that has been recovered, to the server 100, as a response to the read command.

As explained above, in the case where the reading target data has an error, by moving, to the new free block, the entirety of the valid data that has been written in the block into which the error data has been written, it is possible to prevent an error from occurring during the reading operation of the valid data.

In the exemplary embodiments described above, the "page" is used as the unit of the predetermined size; however, the present invention is not limited to this example. Further, although the block numbers and the page numbers are used as the physical addresses that indicate the physical storing positions in the SSDs 60, the present invention is not limited to this example.

In the exemplary embodiments described above, when the data requested to be write by the server 100 is larger than the page size, an arrangement is acceptable in which the RAID controller 50 divides the data into a plurality of pieces that are in units of pages so that the error correction code for one stripe is constituted by using a predetermined number of pieces of data that are in units of pages and is obtained as a result of the dividing of the data. Further, in that situation, an arrangement is acceptable in which the RAID controller 50 assigns a logical address to each of the pieces of data obtained as a result of the dividing of the data by using the logical addresses specified by the server 100, and also, the RAID controller 50 stores, into the management table 76, an association between the logical addresses and the physical addresses at which the pieces of data have been written.

As additional information, a log-structured file system has an advantageous characteristic where the write penalty does not occur, because there is no need to calculate a parity for each writing process of a small block. This method, however, also has a disadvantageous characteristic where the user is not able to select a desired file system because the structure of the file system is defined.

In the exemplary embodiments described above, the example in which the management table 76 has the rows is explained; however, as long as the pieces of data that are to be expressed in each of the rows are associated with one another, it is acceptable to use any other format. For example, it is acceptable to represent the management table 76 by using a list format.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirits of the inventions.

What is claimed is:

1. A semiconductor memory controlling device to which a plurality of semiconductor memory drives are connected and that writes data requested to be written with a logical address specified by an information processing apparatus, the data including one or more pieces of first data, the first data having a predetermined size, the semiconductor memory controlling device comprising:
a write control unit configured to write a predetermined number of the one or more pieces of the first data having the predetermined size and redundant information that is calculated by using the predetermined number of the one or more pieces of the first data and is used for correcting an error in the predetermined number of pieces of the first data into different semiconductor storage drives, respectively;
a constructing unit configured to construct a first table storage area for storing therein a first table by using information about specifications of the semiconductor memory drives, the first table showing:
an association between the logical address and a physical address indicating a position into which the first data is written within the semiconductor memory drives;
identification information for associating the predetermined number of pieces of first data with the redundant information;
a table controlling unit configured to store the first table into the first table storage area, the first table being associated with:
the identification information;
the physical address and the logical address of the predetermined number of pieces of the first data written into the semiconductor memory drives by the write control unit;
a physical address indicating a position in which the redundant information is written;
a reading controlling unit configured to read pieces of second data from the semiconductor memory drives and, if any of the pieces of the second data has an error, read another piece of the second data as well as a second redundant information by referring to the first table, and recover the second data by using said another piece of the second data and the second redundant information;
a determining unit configured to, when a first semiconductor memory drive within the plurality of semiconductor memory drives is replaced with a second semiconductor memory drive, determine whether data stored in the first semiconductor memory drive is to be recovered into the second semiconductor memory drive, based on a predetermined condition while using information about specifications of the second semiconductor memory drive;
when the determining unit determines that the data stored in the first semiconductor memory drive is to be recovered into the second semiconductor memory drive, the reading controlling unit reads, by referring to the first table, said another piece of the second data as well as the second redundant information from the first semiconductor memory drive, and recovers the second data by using said another piece of the second data and the redundant information;
the write control unit writes the recovered second data into the second semiconductor memory drive;
the table controlling unit updates the first table by storing, into the first table storage area, a physical address of the second data written into the first semiconductor memory drive by the write control unit; and
wherein the information about the specifications indicates at least a block size,
when the block size indicated by the information about the specifications of the second semiconductor memory drive is different from a block size of another one of the semiconductor memory drives that store therein said another piece of second data, the constructing unit further constructs a second table storage area for storing therein a second table showing an association between a first physical address in the first semiconductor memory drive and a second physical address in the second semiconductor memory drive, the semiconductor memory controlling device further comprises a first translating unit configured to, when the block size indicated by the information about the specifications of the second semiconductor memory drive is different from the block size of said another one of the semiconductor memory drives that store therein said another piece of second data, translates the first physical address into the second physical address according to the block sizes, and the table controlling unit stores, into the second table storage area, the second table showing the association between the first physical address stored in the first table storage area and the second physical address.

2. The device according to claim 1, wherein the information about the specifications indicates at least a page size, and when the page size indicated by the information about the specifications of the second semiconductor memory drive is different from a page size of another one of the semiconductor memory drives that store therein said second piece of second data, the constructing unit further constructs the second table storage area for storing therein the second table showing the association between the first physical address in the first semiconductor memory drive and the second physical address in the second semiconductor memory drive, the semiconductor memory controlling device further comprises the first translating unit configured to, when the page size indicated by the information about the specifications of the second semiconductor memory drive is different from the page size of said another one of the semiconductor memory drives that store therein said another piece of second data, translates the first physical address into the second physical address according to the page sizes, and the table controlling unit stores, into the second table storage area, the second table showing the association between the first physical address stored in the first table storage area and the second physical address.

3. The device according to claim 1, wherein the predetermined size is a page size, the first data is page size data, the semiconductor memory controlling device further comprises a buffer configured to store therein the first data, and when a number of pieces of the first data stored in the buffer reaches a predetermined number, the write control unit writes each of the predetermined number of pieces of the first data and the redundant information into the different semiconductor memory drives, respectively.

4. The device according to claim 1, wherein the first table is indicative of an association among the logical address, the physical address, and the identification information identifying a set of storage areas, each of the storage areas being included in each of the semiconductor memory drives, the storage areas corresponding to the error correction code that is constituted by the predetermined number of pieces of the first data and the redundant information, the redundant information being calculated by using the predetermined number of pieces of the first data and being used for correcting an error in the predetermined number of pieces of the first data, wherein the device further comprises:
  a data buffer that temporarily stores a write command requesting writing of the first data, for which the logical address is specified;
  a redundant information calculating unit that calculates, when the number of pieces of the first data stored in the data buffer reaches the predetermined number, the redundant information by using the predetermined number of pieces of the first data; and
  an identification information determining unit that determines, when the number of pieces of the first data stored in the data buffer reaches the predetermined number, the identification information identifying the set to be written, and wherein the write control unit, when the number of pieces of the first data stored in the data buffer reaches the predetermined number, writes the error correction code with respect to the set identified by the identification information determined by the identification information determining unit, the error correction code being constituted by the predetermined number of pieces of the first data stored in the data buffer and the redundant information that is calculated by the redundant information calculating unit; and the table controlling unit stores in the first table storage area, per the predetermined number of pieces of the first data for which wiring by the write control unit is performed, the first table that is obtained by associating the logical address, the physical address of a semiconductor memory drive in which the first data is written by the write control unit, and the identification information that is determined by the identification information determining unit.

5. The device according to claim 4, wherein the first table includes:
  a first stage address translation table in which an association is made among the logical address, the identification information, a drive number that is assigned to the semiconductor memory drive having the storage area in which the first data corresponding to the logical address is to be written, and a page number that identifies a page area in the storage area and in which the first data corresponding to the logical address is to be written; and
  a second stage address translation table in which an association is made between the identification information and a block number that identifies a storage area of each of the semiconductor memory drives belonging to the set, and wherein the table controlling unit stores, in association with one another in the first stage address translation table and per the predetermined number of pieces of the first data for which wiring by the write control unit is performed, the logical address, the identification information that is determined by the identification information determining unit, the drive number corresponding to the semiconductor memory drive in which the first data is written by the write control unit, and the page number that identifies the page area in the storage area of the semiconductor memory drive in which the first data is written by the write control unit.

* * * * *